United States Patent
Jamali et al.

(10) Patent No.: US 11,567,326 B1
(45) Date of Patent: Jan. 31, 2023

(54) ACCOMMODATION BIFOCAL OPTICAL ASSEMBLY AND OPTICAL SYSTEM INCLUDING SAME

(71) Applicant: Meta Platforms Technologies, LLC, Menlo Park, CA (US)

(72) Inventors: Afsoon Jamali, Issaquah, WA (US); Yang Zhao, Kirkland, WA (US); Brian Wheelwright, Sammamish, WA (US); Douglas Robert Lanman, Bellevue, WA (US); Marina Zannoli, Bloomington, IN (US); Ian Erkelens, Kirkland, WA (US); Yusufu Njoni Bamaxam Sulai, Snohomish, WA (US); Lu Lu, Kirkland, WA (US); Jacques Gollier, Sammamish, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 78 days.

(21) Appl. No.: 17/085,654

(22) Filed: Oct. 30, 2020

Related U.S. Application Data

(60) Provisional application No. 62/936,944, filed on Nov. 18, 2019.

(51) Int. Cl.
G02B 27/01 (2006.01)
G02C 7/08 (2006.01)
G02F 1/1343 (2006.01)
G02B 27/00 (2006.01)

(52) U.S. Cl.
CPC ..... *G02B 27/0172* (2013.01); *G02B 27/0093* (2013.01); *G02C 7/083* (2013.01); *G02F 1/13439* (2013.01); *G02F 1/134309* (2013.01); *G02C 2202/18* (2013.01); *G02C 2202/20* (2013.01)

(58) Field of Classification Search
CPC .......... G02F 1/13476; G02F 1/133526; G02B 27/0955; H01L 51/5275
See application file for complete search history.

(56) References Cited

U.S. PATENT DOCUMENTS

| | | | |
|---|---|---|---|
| 7,728,949 B2 | 6/2010 | Clarke et al. | |
| 2016/0131912 A1* | 5/2016 | Border | G02B 5/28 345/8 |
| 2019/0086761 A1* | 3/2019 | Galstian | G02F 1/29 |

(Continued)

OTHER PUBLICATIONS

Co-Pending U.S. Appl. No. 15/849,336, filed Dec. 20, 2017, titled "Bifocal Optical Assembly for a Head-Mounted Display."

*Primary Examiner* — Mariam Qureshi
(74) *Attorney, Agent, or Firm* — Millburn IP PLLC

(57) ABSTRACT

A device includes a light source configured to emit an image light. The device also includes an optical assembly configured to direct the image light to an eye-box of the device. The optical assembly includes a first optical element portion configured to focus a first portion of the image light propagating through the first optical element portion. The optical assembly also includes a second optical element portion configured to focus a second portion of the image light propagating through the second optical element portion. The second optical element portion includes a liquid crystal ("LC") lens having an adjustable optical power.

19 Claims, 17 Drawing Sheets

(56) References Cited

U.S. PATENT DOCUMENTS

| | | | |
|---|---|---|---|
| 2020/0033666 A1* | 1/2020 | Li | G02B 5/1876 |
| 2021/0243384 A1* | 8/2021 | Ollila | G02B 27/0093 |
| 2021/0405394 A1* | 12/2021 | Li | G02C 7/083 |

* cited by examiner

ACCOMMODATION BIFOCAL OPTICAL ASSEMBLY AND OPTICAL SYSTEM INCLUDING SAME

CROSS-REFERENCE TO RELATED APPLICATION

This application claims the benefit of priority to U.S. Provisional Patent Application No. 62/936,944, filed on Nov. 18, 2019, the entire content of which is incorporated by reference.

TECHNICAL FIELD

The present disclosure generally relates to optical systems, and more specifically, to an accommodation bifocal optical assembly and an optical system including same.

BACKGROUND

Near-eye displays ("NEDs") have been widely used in, e.g., video playback, gaming, and sports. For example, NEDs such as head-mounted displays ("HMDs") have been used in virtual reality ("VR"), augmented reality ("AR"), or mixed reality ("MR"). It is highly desirable to have an NED that is compact and light-weight, and having a high resolution, a large field of view ("FOV"), and a small form factor. An NED generally has a display element configured to generate an image light that propagates through an optical system to reach an eye (or both eyes) of a user. The optical system includes a plurality of optical elements, such as lenses, waveplates, reflectors, etc., for directing the image light to the eye.

SUMMARY OF THE DISCLOSURE

One aspect of the present disclosure provides a device including a light source configured to emit an image light. The device also includes an optical assembly configured to direct the image light to an eye-box of the device. The optical assembly includes a first optical element portion configured to focus a first portion of the image light propagating through the first optical element portion at a first image plane. The optical assembly also includes a second optical element portion configured to focus a second portion of the image light propagating through the second optical element portion at a second image plane. The second optical element portion includes a liquid crystal ("LC") lens having an adjustable optical power. An image distance of the second image plane is adjustable based on the adjustable optical power of the LC lens.

Another aspect of the present disclosure provides a system including an eye-tracking device configured to obtain eye-tracking information. The system also includes an optical assembly including a first optical element portion configured to focus a first portion of an image light propagating through the first optical element portion. The optical assembly also includes a second optical element portion configured to focus a second portion of the image light propagating through the second optical element portion. The second optical element portion includes a liquid crystal ("LC") lens having an adjustable optical power adjustable based on the eye-tracking information.

Other aspects of the present disclosure can be understood by those skilled in the art in light of the description, the claims, and the drawings of the present disclosure.

BRIEF DESCRIPTION OF THE DRAWINGS

The following drawings are provided for illustrative purposes according to various disclosed embodiments and are not intended to limit the scope of the present disclosure. In the drawings.

DETAILED DESCRIPTION

Figure 1A:
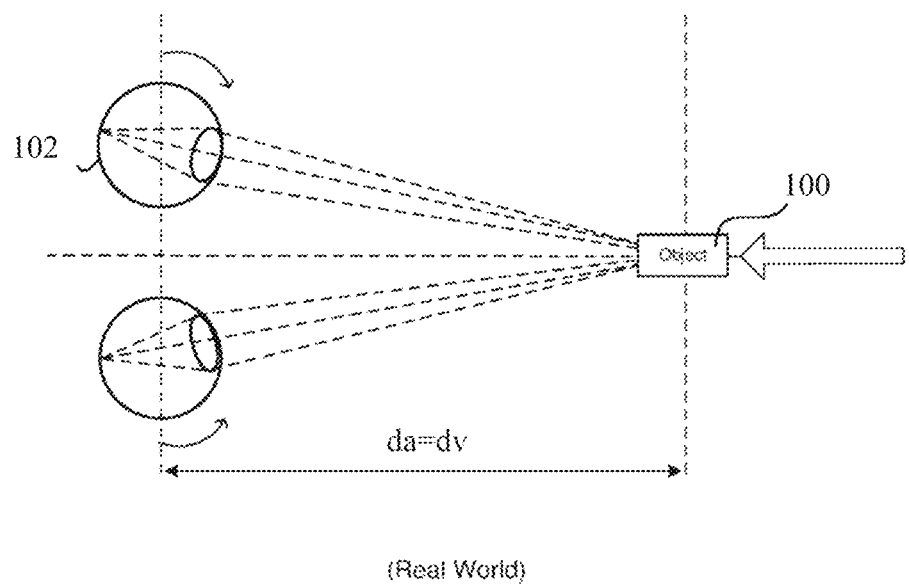
FIG. 1A illustrates a relationship between vergence and eye focal length or accommodation in the real world.

Embodiments consistent with the present disclosure will be described with reference to the accompanying drawings, which are merely examples for illustrative purposes and are not intended to limit the scope of the present disclosure. Wherever possible, the same reference numbers are used throughout the drawings to refer to the same or similar parts, and a detailed description thereof may be omitted.

Further, in the present disclosure, the disclosed embodiments and the features of the disclosed embodiments may be combined. The described embodiments are some but not all of the embodiments of the present disclosure. Based on the disclosed embodiments, persons of ordinary skill in the art may derive other embodiments consistent with the present disclosure. For example, modifications, adaptations, substitutions, additions, or other variations may be made based on the disclosed embodiments. Such variations of the disclosed embodiments are still within the scope of the present disclosure. Accordingly, the present disclosure is not limited to the disclosed embodiments. Instead, the scope of the present disclosure is defined by the appended claims.

As used herein, the terms "couple," "coupled," "coupling," or the like may encompass an optical coupling, a mechanical coupling, an electrical coupling, an electromagnetic coupling, or a combination thereof. An "optical coupling" between two optical elements refers to a configuration in which the two optical elements are arranged in an optical series, and a light output from one optical element may be directly or indirectly received by the other optical element. An optical series refers to optical positioning of a plurality of optical elements in a light path, such that a light output from one optical element may be transmitted, reflected, diffracted, converted, modified, or otherwise processed or manipulated by one or more of other optical elements. In some embodiments, the sequence in which the plurality of optical elements are arranged may or may not affect an overall output of the plurality of optical elements. A coupling may be a direct coupling or an indirect coupling (e.g., coupling through an intermediate element).

The phrase "at least one of A or B" may encompass all combinations of A and B, such as A only, B only, or A and B. Likewise, the phrase "at least one of A, B, or C" may encompass all combinations of A, B, and C, such as A only, B only, C only, A and B, A and C, B and C, or A and B and C. The phrase "A and/or B" may be interpreted in a manner similar to that of the phrase "at least one of A or B." For example, the phrase "A and/or B" may encompass all combinations of A and B, such as A only, B only, or A and B. Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, or A and B and C.

When a first element is described as "attached," "provided," "formed," "affixed," "mounted," "secured," "connected," "bonded," "recorded," or "disposed," to, on, at, or at least partially in a second element, the first element may be "attached," "provided," "formed," "affixed," "mounted," "secured," "connected," "bonded," "recorded," or "disposed," to, on, at, or at least partially in the second element using any suitable mechanical or non-mechanical manner, such as depositing, coating, etching, bonding, gluing, screwing, press-fitting, snap-fitting, clamping, etc. In addition, the first element may be in direct contact with the second element, or there may be an intermediate element between the first element and the second element. The first element may be disposed at any suitable side of the second element, such as left, right, front, back, top, or bottom.

When the first element is shown or described as being disposed or arranged "on" the second element, term "on" is merely used to indicate an example relative orientation between the first element and the second element. The description may be based on a reference coordinate system shown in a figure, or may be based on a current view or example configuration shown in a figure. For example, when a view shown in a figure is described, the first element may be described as being disposed "on" the second element. It is understood that the term "on" may not necessarily imply that the first element is over the second element in the vertical, gravitational direction. For example, when the assembly of the first element and the second element is turned 180 degrees, the first element may be "under" the second element (or the second element may be "on" the first element). Thus, it is understood that when a figure shows that the first element is "on" the second element, the configuration is merely an illustrative example. The first element may be disposed or arranged at any suitable orientation relative to the second element (e.g., over or above the second element, below or under the second element, left to the second element, right to the second element, behind the second element, in front of the second element, etc.).

When the first element is described as being disposed "on" the second element, the first element may be directly or indirectly disposed on the second element. The first element being directly disposed on the second element indicates that no additional element is disposed between the first element and the second element. The first element being indirectly disposed on the second element indicates that one or more additional elements are disposed between the first element and the second element.

The term "processor" used herein may encompass any suitable processor, such as a central processing unit ("CPU"), a graphics processing unit ("GPU"), an application-specific integrated circuit ("ASIC"), a programmable logic device ("PLD"), or any combination thereof. Other processors not listed above may also be used. A processor may be implemented as software, hardware, firmware, or any combination thereof.

The term "controller" may encompass any suitable electrical circuit, software, or processor configured to generate a control signal for controlling a device, a circuit, an optical element, etc. A "controller" may be implemented as software, hardware, firmware, or any combination thereof. For example, a controller may include a processor, or may be included as a part of a processor.

The term "non-transitory computer-readable medium" may encompass any suitable medium for storing, transferring, communicating, broadcasting, or transmitting data, signal, or information. For example, the non-transitory computer-readable medium may include a memory, a hard disk, a magnetic disk, an optical disk, a tape, etc. The memory may include a read-only memory ("ROM"), a random-access memory ("RAM"), a flash memory, etc.

The wavelength ranges, spectra, or bands mentioned in the present disclosure are for illustrative purposes. The disclosed optical device, system, element, assembly, and method may be applied to a visible wavelength range, as well as other wavelength ranges, such as an ultraviolet ("UV") wavelength range, an infrared ("IR") wavelength range, or a combination thereof.

Existing near-eye displays for VR, AR, and/or MR applications often have the so-called vergence-accommodation conflict, where a stereoscopic image pair drives the vergence state of a user's human visual system to arbitrary distances, but the accommodation or focusing state of the user's eyes is optically driven towards a fixed distance. The vergence-accommodation conflict causes eye strain or headaches during prolonged VR/AR/MR sessions, thereby significantly degrading the visual experience of the users. In addition, different users wearing the same NED may have different accommodation abilities, e.g., in accordance with an age of a user. In general, older people have a weaker capability to accommodate than younger people, i.e., an accommodative range of older people is smaller than that of younger people. Therefore, an optical assembly that can efficiently drive the accommodation for different users and mitigate the vergence-accommodation conflict is highly desirable for NEDs. The disclosed bifocal optical assembly and the NED including the bifocal optical assembly are directed to solve one or more issues in existing technologies.

Embodiments of the present disclosure may include or be implemented in conjunction with an artificial reality system.

Artificial reality is a form of reality that has been adjusted in some manner prior to presentation to a user, which may include, e.g., a virtual reality ("VR"), an augmented reality ("AR"), a mixed reality ("MR"), or a combination and/or derivative thereof. Artificial reality content may include computer generated content or computer generated content combined with captured (e.g., real-world) content. The artificial reality content may include video, audio, haptic feedback, or a combination thereof, which may be presented in a single channel or in multiple channels (such as stereo videos that produce a three-dimensional effect to the viewer). Additionally, in some embodiments, the artificial reality may also be associated with applications, products, accessories, services, or a combination thereof, which may be implemented to, e.g., create content in an artificial reality and/or to perform activities in an artificial reality environment. The artificial reality system that provides the artificial reality content may be implemented on various platforms, including a near-eye display ("NED"), such as a head-mounted display ("HMD"), head-up display ("HUD'), etc., which may be connected to a host computer system, a standalone NED (e.g., HMD), a mobile device or a mobile computer, or any other hardware platforms capable of providing artificial reality content to one or more users.

The present disclosure provides a system, e.g., a near-eye display ("NED"). An example of the NED may be a head-mounted display ("HMD"). The NED may include an electronic display configured to emit an image light, and an optical assembly configured to direct the image light to an eye-box of the NED. The optical assembly may include a multifocal optical element. The multifocal optical element may include a first optical element portion having a first optical power to focus a first portion of the image light propagating through the first optical element portion at a first image plane. The multifocal optical element may include a second optical element portion having a second optical power to focus a second portion of the image light propagating through the second portion at a second image plane. The second optical element portion may include a liquid crystal ("LC") lens having an adjustable optical power. An image distance of the second image plane may be adjustable in accordance with the optical power of the LC lens.

The present disclosure also provides a system. The system may be a dynamic multifocal lens assembly system. The dynamic multifocal lens assembly system may include an eye-tracking device and an optical assembly. The eye-tracking device may be configured to obtain eye tracking information relating to eyes of a user. The optical assembly may include a multifocal optical element. The multifocal optical element may include a first optical element portion having a first optical power to focus a first portion of the image light propagating through the first optical element portion at a first image plane. The multifocal optical element may include a second optical element portion having a second optical power to focus a second portion of the image light propagating through the second optical element portion at a second image plane. The second optical element portion may include a liquid crystal ("LC") lens having an adjustable optical power. An image distance of the second image plane may be adjustable in accordance with the optical power of the LC lens.

Vergence-accommodation conflict exists in many artificial reality systems. Vergence is the simultaneous movement or rotation of both eyes in opposite directions to obtain or maintain a single binocular vision and is linked to accommodation of the eyes. Under normal conditions, when human eyes switch from looking at a first object to looking at a second object at a distance different from the distance of the first object, the eyes automatically change focus (by changing the shape of the crystalline lens) to provide accommodation at the new distance (or vergence distance) of the second object. In addition, the accommodation capability varies for eyes of different people. In general, older people have a weaker capability of accommodation than younger people, i.e., older people have a smaller accommodative range than younger people.

FIG. 1A illustrates a relationship between vergence and eye focal length (i.e., accommodation) in the real world environment. As shown in FIG. 1A, eyes 102 of a user are looking at a real object 100 located at a distance from the user, i.e., the real object 100 located at the distance from the user is in focus. The eyes 102 of the user are verged on the real object 100 and gaze lines from the eyes 102 intersect at the real object 100. Thus, the vergence distance ($d_v$) is equal to the accommodative distance ($d_a$). The accommodative distance ($d_a$) is the distance to which the eyes have to be focused to create a sharp retinal image. When the real object 100 is moved closer to the user, as indicated by the arrow in FIG. 1A, each eye 102 rotates inwardly (as indicated by the curved arrows in FIG. 1A) to maintain the vergence on the real object 100. When the real object 100 is moved closer to the eyes 102, the eyes 102 have to "accommodate" for the closer distance by changing the shape of the crystalline lens to reduce the eye focal length or increase the eye optical power. Thus, under normal conditions in the real world environment (and for young people), the vergence distance ($d_v$) is still equal to the accommodative distance ($d_a$) when the eyes 102 look at objects that are close to the eyes 102. The vergence distance and the accommodative distance are substantially equal in the real world environment.

Figure 1B:
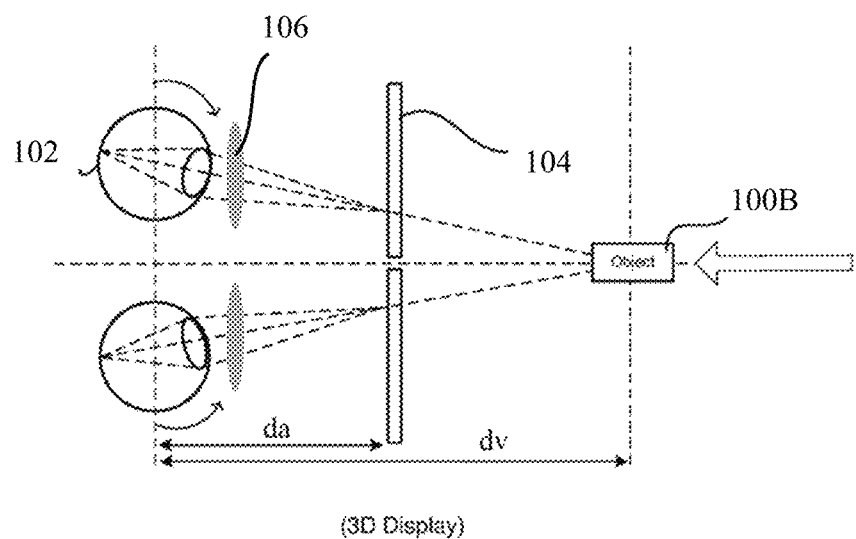
FIG. 1B illustrates a vergence-accommodation conflict in a three-dimensional (3D) display.

FIG. 1B illustrates a vergence-accommodation conflict in a three-dimensional ("3D") display, e.g., a fixed-focus NED. As shown in FIG. 1B, a user may be looking at a virtual object 100B displayed by a 3D electronic display 104. An eyepiece 106 may be positioned in front of each eye 102. The eyes 102 are verged on the virtual object 100B and gaze lines from the eyes 102 intersect at the virtual object 100B, which is farther to the eyes 102 than the 3D electronic display 104. When the virtual object 100B is rendered by the 3D electronic display 104 to appear closer to the user, each eye 102 again rotates inwardly (as indicated by curved arrows in FIG. 1B) to maintain verging on the virtual object 100B. The eyes 102 accommodate when verging on the virtual object 100B. However, the accommodation stimulus may be incorrect and the focal length of the eye 102 may not be sufficiently reduced. Thus, the focus of the eye 102 is still at a distance where the virtual object 100B was located prior to appearing closer to the eyes 102, and the virtual object 100B rendered by the 3D electronic display 104 appears blurry to the eyes 102. Thus, instead of increasing the optical power of the eyes 102 or reducing the focal length of the eyes 102 to accommodate the reduced vergence distance, the eyes 102 maintain accommodation at a distance where the virtual object 100B was located prior to appearing closer to the eyes 102. That is, the vergence distance ($d_v$) may not be equal to the accommodative distance ($d_a$) for the human eyes for objects displayed by the 3D electronic display 104.

Such a discrepancy between the vergence distance and the accommodative distance is referred to as a "vergence-accommodation conflict." The vergence-accommodation conflict may worsen when multiple virtual objects are displayed across a wide range of distances to the user from a short distance to a long distance, and/or when the display augments a relatively close real-world scene with virtual objects. A user who experiences only vergence or accommodation but not both will eventually experience some degree of fatigue and nausea, which significantly degrade the user's viewing experience. In addition, different users using the same NED may have different accommodation abilities, e.g., depending on the ages of the users. In general, older people have a weaker capability to accommodate than younger people, i.e., an accommodative range of older people is smaller than that of younger people. Embodiments of the present disclosure relate to an optical assembly configured to provide optical correction during accommodation in the NEDs and mitigate vergence-accommodation conflict for users of different ages. The optical assembly may be a part of the eyepiece 106.

Figure 2A:
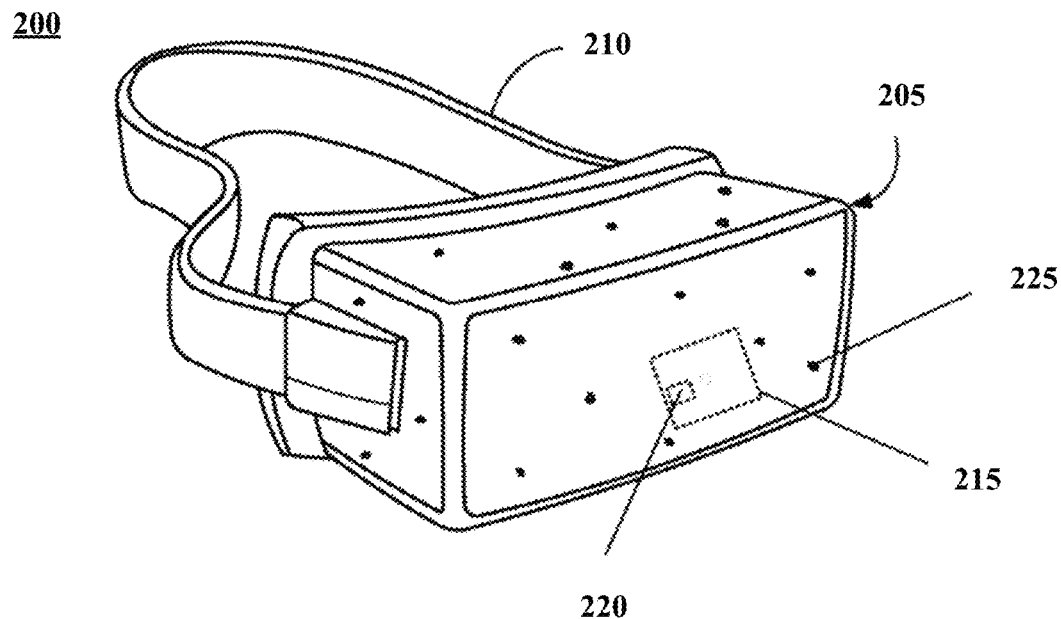
FIG. 2A schematically illustrates a perspective view of a near-eye display ("NED"), according to an embodiment of the disclosure.

FIG. 2A schematically illustrates a perspective view of an NED 200, according to an embodiment of the disclosure. The NED 200 may be a part of an artificial reality ("AR") system, a virtual reality ("VR") system, and/or a mixed reality ("MR") system. The NED 200 may display content to a user. As shown in FIG. 2A, the NED 200 may include a front body 205 and a band 210. The front body 205 may include an electronic display including one or more electronic display elements (not drawn in FIG. 2A), an inertial measurement unit ("IMU") 215, one or more position sensors 220, and one or more locators 225. In the embodiment shown in FIG. 2A, the position sensors 220 may be located within the IMU 215. In some embodiments, the IMU 215 and the position sensors 220 may be invisible to the user. The IMU 215, the position sensors 220, and the locators 225 are described in detail below with regard to FIG. 10. The NED 200 may function as a VR device, an AR device, or an MR device, or a combination thereof. In some embodiments, when the NED 200 functions as an AR or an MR device, portions of the exterior housing of the NED 200 may be transparent, and some internal components may be at least partially visible to a user.

Figure 2B:
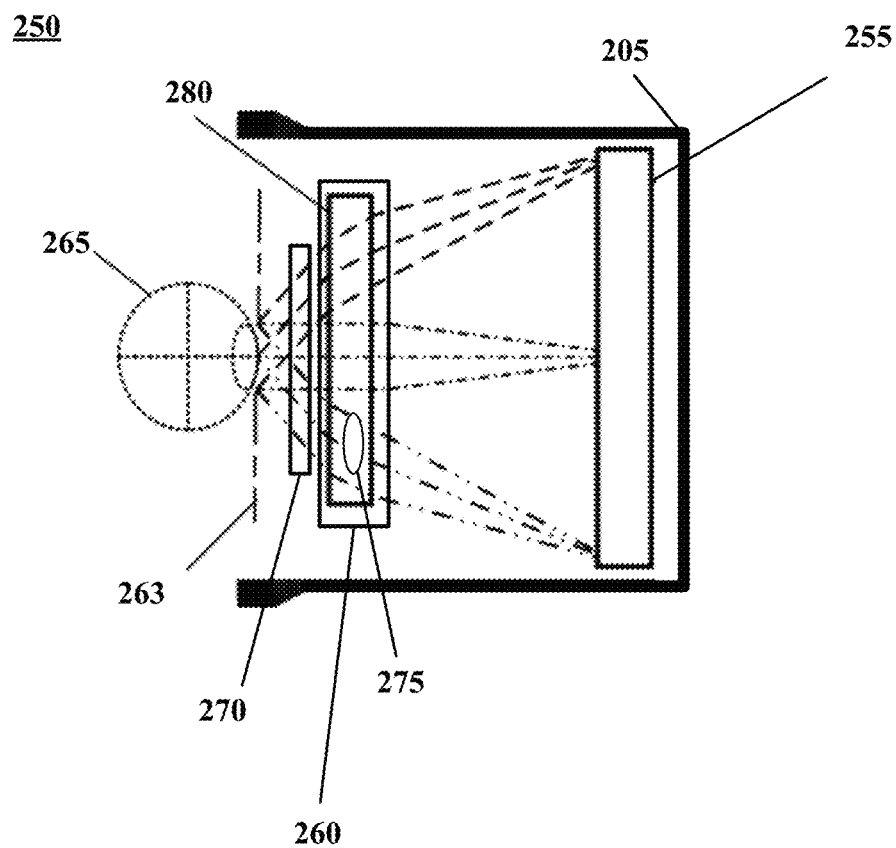
FIG. 2B illustrates a cross-section of a front body of the NED shown in FIG. 2A, according to an embodiment of the disclosure.

FIG. 2B is a cross section 250 of the front body 205 of the embodiment of the NED 200 shown in FIG. 2A. As shown in FIG. 2B, the front body 205 may include an electronic display 255 configured to generate an image light and an optical assembly 260 configured to direct the image light emitted from the electronic display 255 to an eye-box of the NED 200 located at an exit pupil 263. The exit pupil 263 may be the location of the front body 205 where an eye 265 of a user is positioned. For illustrative purposes, FIG. 2B shows a cross-section associated with a single eye 265. Another similar optical assembly separate from the optical assembly 260 may be included in the NED 200 to provide altered image lights to another eye of the user.

The electronic display 255 may generate an image light and display images to the user in accordance with data received from a console (not drawn in FIG. 2B). In some embodiments, the electronic display 255 may include a single electronic display or multiple electronic displays (e.g., a display for each eye of a user). Examples of the electronic display 255 include: a liquid crystal display ("LCD"), an organic light-emitting diode ("OLED") display, an active-matrix organic light-emitting diode display ("AMOLED"), a quantum dot organic light-emitting diode ("QOLED"), a quantum dot light-emitting diode ("QLED"), a micro-LED display, a laser scanning display, a combination thereof, or any other suitable display. In some embodiments, the electronic display 255 may include a stack of one or more waveguide displays including, but not limited to, a stacked waveguide display. In some embodiments, the stacked waveguide display may be a polychromatic display (e.g., a red-green-blue ("RGB") display) created by stacking waveguide displays in which image lights are from respective monochromatic light sources of different colors. In some embodiments, the stacked waveguide display may be a monochromatic display.

In some embodiments, the front body 205 may further include an eye-tracking system 270 that determines eye-tracking information for the eye 265. In some embodiments, the eye-tracking system 270 may include suitable elements to obtain eye-tracking information. For example, the eye-tracking system 270 may include one or more light sources configured to illuminate one or both eyes of the user. In some embodiments, the eye-tracking system 270 may include one or more sensors (e.g., optical sensors such as cameras, or other sensors) configured to capture data (e.g., images, other sensor information) of one or both eyes of the user for determining eye-tracking information. In some embodiments, the eye-tracking system 270 may include a processor configured to control the sensors (e.g., camera or other suitable sensors), the light sources, and/or to analyze the sensor data (e.g., captured images) to obtain the eye-tracking information. The determined eye-tracking information may include information of an orientation of the eye 265 in the eye-box, i.e., information about an angle of an eye gaze. In some embodiments, the eye 265 may be illuminated by a structured light, and the eye-tracking system 270 may use locations of the structured light reflected by the eye 265 as included in a captured image to determine the position and eye gaze of the eye 265 (or eyes 265). In some embodiments, the eye-tracking system 270 may determine the position and eye gaze of the eye 265 (or eyes 265) based on magnitudes of the image lights captured over a plurality of time instants or time durations.

The optical assembly 260 may magnify the image light received from the electronic display 255, correct optical aberrations associated with the image light, and mitigate the vergence-accommodation conflict. The optical assembly 260 may include various optical elements configured to adjust the image light emitted from the electronic display 255, such as an aperture, a Fresnel lens, a refractive lens, a reflective surface, a diffractive element, a waveguide, a filter, or a combination thereof. With the optical assembly 260 magnifying the image light, elements of the electronic display 255 may made smaller, lighter, and less power consuming than larger displays. In addition, magnification may increase a field of view ("FOV") of the displayed media content. For example, the displayed media content may be presented with an FOV that is substantially the same as or larger than the FOV of the image light generated by the light source.

In the disclosed embodiments, the optical assembly 260 may include a multifocal optical element 280, such as a bifocal optical element, a trifocal optical element, or a progressive optical element. In some embodiments, the multifocal optical element 280 may be a bifocal optical element 280. The bifocal optical element 280 may have a specific optical power except for a predetermined optical element portion of the bifocal optical element 280. In some embodiments, the predetermined optical element portion of the bifocal optical element 280 may be positioned below an optical axis of the NED 200. For example, the user of the NED 200 may gaze down (e.g., below the optical axis) to look through the predetermined optical element portion of the bifocal optical element 280.

The bifocal optical element 280 may allow users of different accommodative ranges to view content presented through the bifocal optical element 280 in at least a first image plane and a second image plane, e.g., the first image plane for content not viewed through the predetermined optical element portion of the bifocal optical element 280 and the second image plane for content viewed through the predetermined optical element portion of the bifocal optical element 280, which may be realized by configuring an accommodative range between the first image plane and second image plane. That is, through configuring the bifocal optical element 280 to generate two separate image planes that are at different image distances (or at different distances from the eye), users having different ranges of accommodation (e.g., older users and younger user) may be able to focus on either of the two image planes, thereby allowing the NED 200 to be used by users having different ranges of accommodation.

In some embodiments, the predetermined optical element portion of the bifocal optical element 280 may include a varifocal lens 275 having an adjustable focal length or optical power, for example, via adjusting an external electric field applied to the varifocal lens 275. In some embodiments, the varifocal lens 275 may provide a continuous adjustment range of optical power to the predetermined optical element portion of the bifocal optical element 280. In some embodiments, during operations, the varifocal lens 275 may be actively and selectively controlled by a controller or processor to provide a predetermined optical power at a time, without or substantially without optical interferences from the remaining optical element portions of the bifocal optical element 280. In some embodiments, the varifocal lens 275 may be controlled by the controller or the processor to provide an optical power smaller than, larger than, or equal to that of the remaining optical element portions of the bifocal optical element. The bifocal optical element 280 that includes the varifocal lens 275 may be referred to as an active bifocal optical element or a dynamic bifocal optical element. The multifocal optical element 280 that includes the varifocal lens 275 may be referred to as an active multifocal optical element or a dynamic multifocal optical element. In some embodiments, the active (or dynamic) multifocal optical element may be an active (or dynamic) multifocal lens assembly.

The bifocal optical element 280 may mitigate a vergence-accommodation conflict in NED 200 via the varifocal lens 275. In some embodiments, based on the eye-tracking information obtained by the eye-tracking system 270, an optical power of the varifocal lens 275 included in the predetermined optical element portion of the bifocal optical element 280 may be adjusted, thereby adjusting the image distance of the second image plane for content viewed through the predetermined optical element portion of the bifocal optical element 280. In particular, the varifocal lens 275 may be able to adjust the optical power sufficiently fast to keep pace with eye accommodation (e.g., accommodation occurs in around 300 ms), such that the vergence-accommodation conflict in the NED 200 may be resolved. More details of the bifocal optical element 280 including the varifocal lens 275 will be described below in connection with FIG. 3.

Figure 3:
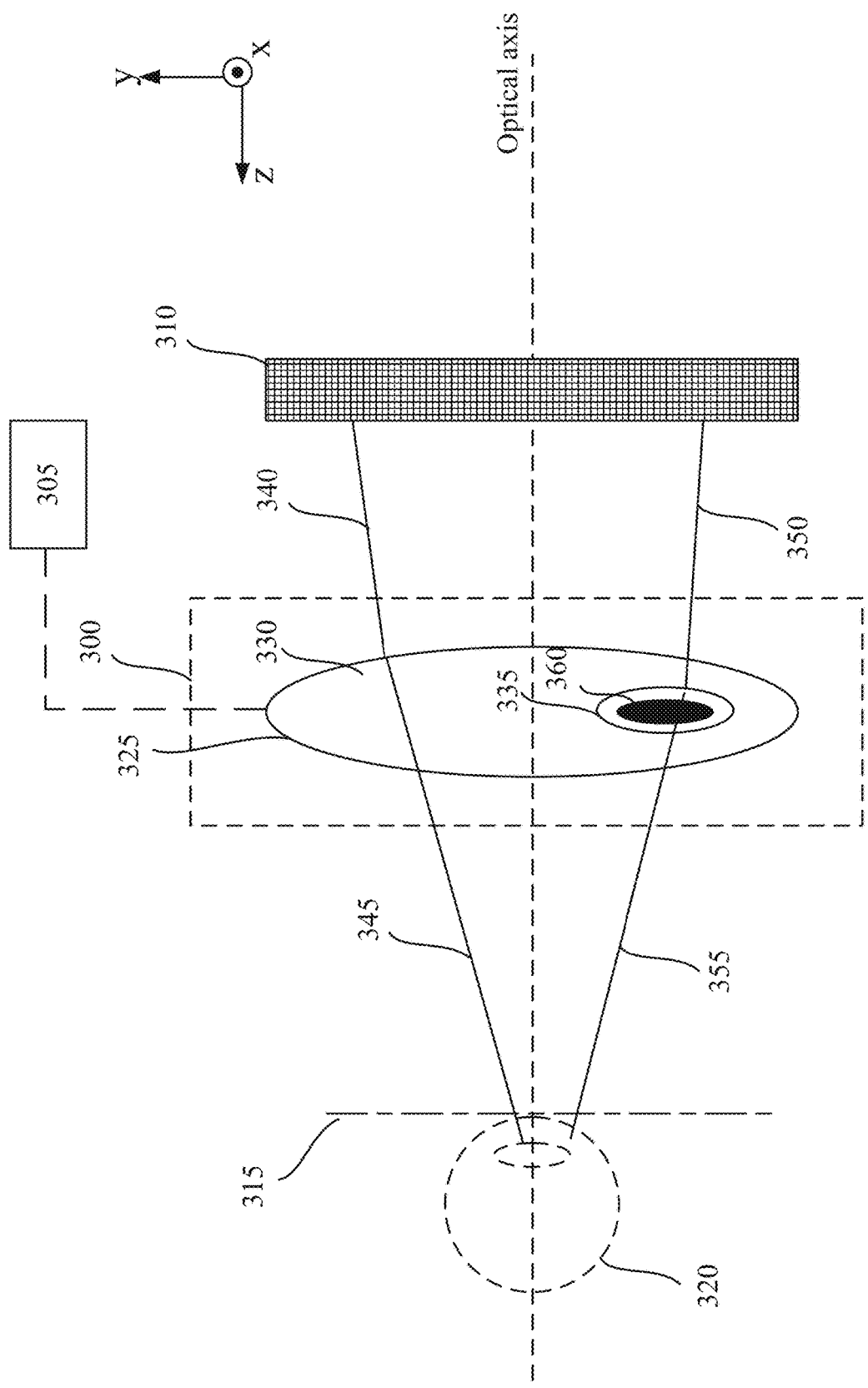
FIG. 3 illustrates a cross-section of an optical assembly coupled to an electronic display, according to an embodiment of the disclosure.

FIG. 3 schematically illustrates an optical assembly 300 coupled to an electronic display 310 and a controller 305, which may be included in the NED 200 shown in FIG. 2A, according to an embodiment of the present discourse. The optical assembly 300 and the electronic display 310 may be embodiments of the optical assembly 260 and the electronic display 255 shown in FIG. 2B, respectively. As shown in FIG. 3, the optical assembly 300 may be arranged between the electronic display 310 and an eye 320 of a user. The optical assembly 300 may provide optical corrections to an image light emitted from different portions of the electronic display 310, and direct the optically corrected image light to an eye-box 315 of the NED 200 corresponding to a location of the eye 320. In addition, the optical assembly 300 may also mitigate the vergence-accommodation conflict for a variety of users, such as users having different accommodative ranges (or ranges of accommodation).

The optical assembly 300 may include a multifocal optical element 325. In some embodiments, the multifocal optical element 325 may be a bifocal optical element, a trifocal optical element, or a progressive optical element. The bifocal optical element is used as an example of the multifocal optical element 325 in below discussion. The bifocal optical element 325 may be an active bifocal optical element having a first optical element portion 330 and a second optical element portion 335. The second optical element portion 335 may be embedded or encapsulated in the first optical element portion 330 to form the bifocal optical element 325, such that the second optical element portion 335 may be integrated into the NED 200 with the first optical element portion 330. The bifocal optical element 325 may be spherical, aspherical, consisting of a polynomial basis, or of a free-form. In some embodiments, the optical assembly 300 may further include other optical elements disposed in an optical series with the bifocal optical element 325, such as a linear polarizer, a quarter-wave plate, etc.

In some embodiments, the first optical element portion 330 of the bifocal optical element 325 may include a conventional optical material for fabricating eyeglasses, e.g., glass, polycarbonate ("PC"), polymethylmethacrylate ("PMMA"), or a combination thereof. In some embodiments, the first optical element portion 330 may provide a first optical power to correct ametropia of a user, e.g., myopia. In some embodiments, the first optical element portion 330 may be a plano-lens with a zero optical power, which may function as a carrier for the second optical element portion 335. The second optical element portion 335 of the bifocal optical element 325 may include a varifocal lens 360 with an adjustable focal length or optical power. The focal length or the optical power of the varifocal lens 360 may be adjusted by, for example, an external electric field applied to the varifocal lens 360. In some embodiments, the varifocal lens 360 may provide a continuous adjustment range of optical powers to the predetermined optical element portion of the bifocal optical element 325. Although the varifocal lens 360 provides more than one optical power, the varifocal lens 360 may form clearly perceivable images that are focused by one optical power at a time. Consequently, the varifocal lens 360 may not produce blurred or fogged images, unlike conventional bifocal lenses such as concentric simultaneous bifocal lenses. The varifocal lens 360 may be controlled by the controller 305 to provide an optical power smaller than, larger than, or equal to that of first optical element portion 330 at a time, according to different application scenarios.

In some embodiments, the varifocal lens 360 may include an LC lens, which is controlled by the controller 305 to adjust the optical power sufficiently fast to keep pace with eye accommodation (e.g., accommodation occurs in around 300 ms), such that the vergence-accommodation conflict in the NED may be resolved. In some embodiments, the LC lens may include a Fresnel structure, e.g., the LC lens may be a Fresnel LC lens. The Fresnel LC lens may include any suitable type of Fresnel structure, such as a Fresnel zone plate lens including areas that have a phase difference of a half wave to adjacent areas, a diffractive Fresnel lens having a segmented parabolic phase profile where the segments are small and can result in significant diffraction, or a refractive Fresnel lens having a segmented parabolic profile where the segments are sufficiently large such that diffraction effects are minimized. Other structures may also be used for the Fresnel LC lens. In some embodiments, the varifocal lens 360 may include a refractive Fresnel LC lens having a segmented parabolic profile, where the size of the segments is sufficiently large such that the diffraction angle is smaller than the angular resolution of human eyes. Thus, the diffraction effects may be unobservable by human eyes. Such a refractive Fresnel LC lens may be referred to as a segmented phase profile ("SPP") LC lens. The details of the SPP LC lens will be described below in connection with FIGS. 5, 6A and 6B, 7A and 7B, 8, and 9A and 9B.

Referring to FIG. 3, the electronic display 310 may emit image lights representing displayed media content towards the bifocal optical element 325. In some embodiments, the electronic display 310 may emit an image light 340 from a first portion of the electronic display 310 located above an optical axis of the electronic display 310, where the image light 340 may correspond to a far or distant virtual object displayed by the first portion of the electronic display 310. The first optical element portion 330 of the bifocal optical element 325 may direct the image light 340 to the eye 320 as an image light 345. The image light 345 may provide the far virtual object to the eye 320 at a first image plane, where the eye 320 looking through the first optical element portion 330 of the bifocal optical element 325 may be far focused. That is, the first optical element portion 330 of the bifocal optical element 325 may focus the image light viewed through the first optical element portion at the first image plane. In some embodiments, the first image plane may cover an upper portion or both the upper portion and a central portion of an FOV of an NED (e.g., the NED 200 shown in FIG. 2A), in which the electronic display 310 and the optical assembly 300 may be implemented. The upper portion or both the upper portion and the central portion of the FOV may naturally correspond to the far or distant vision of human eyes. In some embodiments, the first optical element portion 330 of the bifocal optical element 325 may further provide an optical correction to the image light 340 to correct ametropia of a user, e.g., myopia, and generate the optically corrected image light 345 at the first image plane. The optical correction provided to the image light 340 may be determined by the first optical power of the first optical element portion 330. The first optical power may be determined by the shape and the refractive index of the first optical element portion 330.

In some embodiments, the electronic display 310 may emit an image light 350 from a second portion of the electronic display 310 located below the optical axis. The image light 350 may correspond to a near virtual object displayed by the second portion of the electronic display 310. The second optical element portion 335 of the bifocal optical element 325 may direct the image light 350 to the eye 320 as an image light 355. The image light 350 may provide the near virtual object to the eye 320 at a second image plane, where the eye 320 looking through the second optical element portion 335 of the bifocal optical element 325 may be near focused. That is, the second optical element portion 335 of the bifocal optical element 325 may focus the image light viewed through the second optical element portion 335 at the second image plane. In some embodiments, the second image plane may cover a lower portion of the FOV of the NED, which may naturally correspond to near vision of human eyes. When the vergence distance of the near virtual object is changed (e.g., the near virtual objected may be rendered by the electronic display 310 to appear closer to the eye 320), the varifocal lens 360 included in the second optical element portion 335 may be controlled by the controller 305 to adjust an orientation of the image light 350 output from the varifocal lens 360, e.g., by the controller 305 adjusting the optical power of the varifocal lens 360, such that the image light 355 output from the varifocal lens 360 may appear at the second image plane with a particular image distance (i.e., a particular distance from the eye 320 of the user) to mitigate the vergence-accommodation conflict. That is, the image distance of the second image plane may be adjustable in accordance with the optical power of the varifocal lens 360.

In some embodiments, the bifocal optical element 325 may have two operation states: an active state and an inactive state. When operating in the inactive state, the second optical element portion 335 of the bifocal optical element 325 may be deactivated. Accordingly, the varifocal lens 360 in the second optical element portion 335 may be deactivated and may not provide an optical power, e.g., to the image light 350 associated with the lower portion of the FOV. When operating in the active state, the second optical element portion 335 of the bifocal optical element 325 may be activated. Accordingly, the varifocal lens 360 may be activated to adjust an orientation of the image light 350 output from the varifocal lens 360, e.g., via the controller 305 adjusting the optical power of the varifocal lens 360, such that the image light 355 transmitted through the varifocal length 360 appears at the second image plane with a particular image distance to mitigate the vergence-accommodation conflict.

As shown in FIG. 3, the controller 305 may be coupled to the bifocal optical element 325, and may be configured to determine an operation state of the active bifocal optical element 325. The controller 305 may adjust the optical power of the varifocal lens 360 based on the eye-tracking information obtained by the eye-tracking system 270 shown in FIG. 2B. The controller 305 may track the position or location of the eye(s) 320 based on information (e.g., eye-tracking information, such as images of the eye) from the eye-tracking system 270. The controller 305 may determine a location or an object within a virtual image at which the user is looking based on the tracked position or location of the eye(s) 320. In some embodiments, the controller 305 may track the position of the eye 320, including, e.g., at least one of a 3D position, a roll, a pitch, or a yaw of the eye 320, and may estimate a 3D gaze point of each eye 320 based on the tracked position. In some embodiments, the controller 305 may estimate the position of the eye 320 and/or the gate point of the eye 320 based on information relating to historical eye positions, information relating to a position of the user's head, and/or information relating to a scene presented to the user.

When the controller 305 determines that the eye 320 is looking at a far virtual object or a location at a virtual image displayed by the electronic display 310 where the far virtual object or the location is corresponding to an upper portion and/or a central portion of the FOV through the first optical element portion 330 of the bifocal optical element 325, the controller 305 may deactivate the bifocal optical element 325. When the controller 305 determines that the eye 320 is looking at a near virtual object or a location at a virtual image displayed on the electronic display 310 where the near virtual object or the location is corresponding to a lower portion of the FOV through the second optical element portion 335 of the bifocal optical element 325, the controller 305 may activate the bifocal optical element 325. In addition, the controller 305 may determine a vergence distance of the near virtual object that the eye 320 is currently looking at through the second optical element portion 335 based on an estimated intersection of gaze lines. Based on the vergence distance of the virtual scene and other information, the controller 305 may determine an optical power to be provide by the second optical element portion 335 (e.g., an optical power of the varifocal lens 360). Based on the determined optical power of the varifocal lens 360 and the eye tracking information, the controller 305 may determine configuration parameters for the one or more LC lenses in the varifocal lens 360. For example, based on the eye-tracking information, the controller 305 may activate one or more LC lenses corresponding to the eye position for each eye of the user. Based on the determined optical power, the controller 305 may determine a voltage to be applied to electrodes of the one or more activated LC lens, thereby focusing the near virtual object at the second image plane with an image distance corresponding to the vergence distance.

Figure 4A:
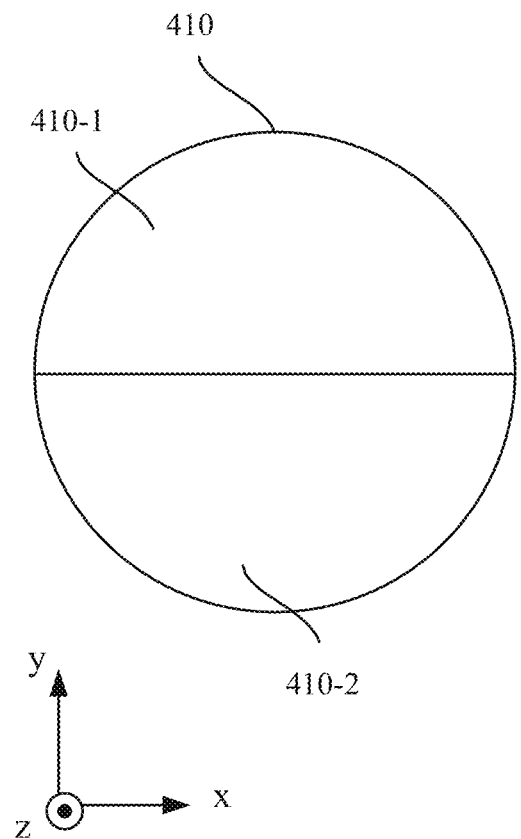
FIG. 4A illustrates a cross-section of a bifocal optical element, according to an embodiment of the disclosure.
Figure 4B:
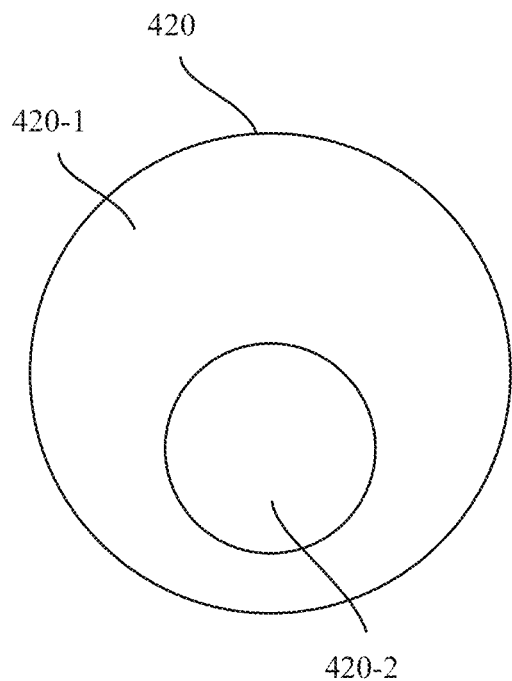
FIG. 4B illustrates a cross-section of a bifocal optical element, according to another embodiment of the disclosure.
Figure 4C:
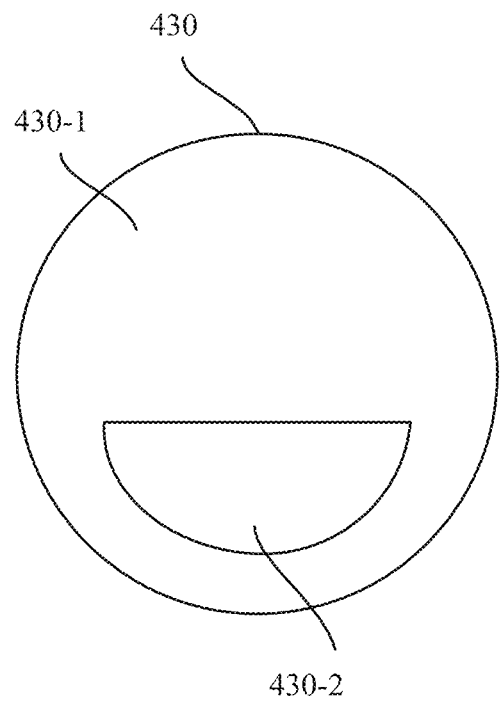
FIG. 4C illustrates a cross-section of a bifocal optical element, according to another embodiment of the disclosure.

FIGS. 4A-4C illustrate cross sections of bifocal optical elements 410, 420, and 430, respectively, according to embodiments of the disclosure. The bifocal optical elements 410, 420, and 430 may be embodiments of the bifocal optical element 325 shown in FIG. 3. As shown in FIGS. 4A-4C, an aperture of the bifocal optical elements 410, 420, and 430 may have a circular shape. The circular shape is one example of the shape of the aperture. The aperture may include any other suitable shape. The aperture may be divided in two or more optical element portions in a suitable configuration. In the embodiment shown in FIG. 4A, the aperture of the bifocal optical element 410 may be divided into a first optical element portion 410-1, i.e., the upper half of the bifocal optical element 410, and a second optical element portion 410-2, i.e., the lower half of the bifocal optical element 410. In the embodiment shown in FIG. 4B, the aperture of the bifocal optical element 420 may be divided into a first optical element portion 420-1 and a second optical element portion 420-2. The second optical element portion 420-2 may be a portion of a lower half of the bifocal optical element 420. The first portion 420-1 may be the remaining portion of the bifocal optical element 420. In the embodiment shown in FIG. 4C, the aperture of the bifocal optical element 430 may be divided into a first optical element portion 430-1 and a second optical element portion 430-2. The second optical element portion 430-2 of the bifocal optical element 430 may be a portion of a lower half of the bifocal optical element 430, and the first optical element portion 430-1 may be the remaining portion of the bifocal optical element 430.

The shapes of the cross sections of the second optical element portions 410-2, 420-2, and 430-2 shown in FIGS. 4B and 4C are for illustrative purposes. The second optical element portions 420-2 and 430-2 may include any suitable shapes.

Figure 5:
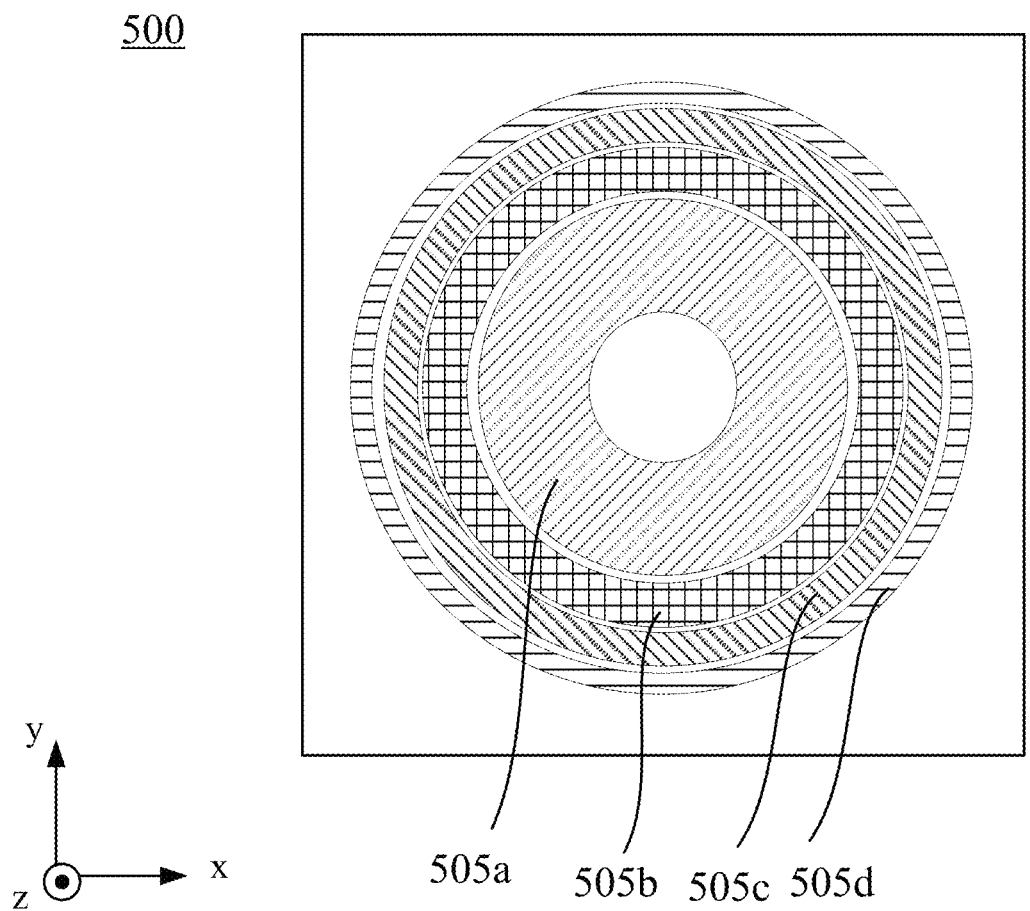
FIG. 5 illustrates a schematic diagram of a segmented phase profile ("SPP") liquid crystal ("LC") lens, according to an embodiment of the disclosure.

FIG. 5 illustrate a schematic diagram of an SPP LC lens 500 according to an embodiment of the disclosure. As shown in FIG. 5, the Fresnel structure of the SPP LC lens 500 is represented by a plurality of concentric ring-shaped zones 505a, 505b, 505c, and 505d of increasing radii, which are referred as Fresnel segments or Fresnel resets. For a positive thin lens, an optical path difference ("OPD") is approximated with Maclaurin series to a parabolic profile as shown in Equation (1)

$$OPD(r) = \frac{-r^2}{2f}, \quad (1)$$

where r is the lens radius (i.e., half of the lens aperture) and f is the focal length. The OPD of an LC lens is proportional to the cell thickness d and the birefringence $\Delta n$ of the LC material as shown in Equation (2)

$$OPD = d * \Delta n, \quad (2)$$

The response time $\tau$ of an Electrically Controlled Birefringence (ECB) LC cell, which is the time the material takes to recover to its original state, is quadratically dependent on cell thickness d ($\tau \propto d^2$) as shown in Equation (3)

$$\tau = \frac{\gamma \times d^2}{K_{11} \times \pi^2}, \quad (3)$$

where $\gamma$ and $K_{11}$ are the rotational viscosity and the splay elastic constant of the LC material, respectively. Equations (1)-(3) show that there is a tradeoff between the aperture size and response time, and thus it is challenging to design an LC lens with a large aperture and a reasonable response time. In the disclosed embodiments, though introducing phase resets in the parabolic phase profile, e.g., using an SPP LC lens, the LC lens may be configured with a large aperture size without compromising the response time.

Figure 6A:
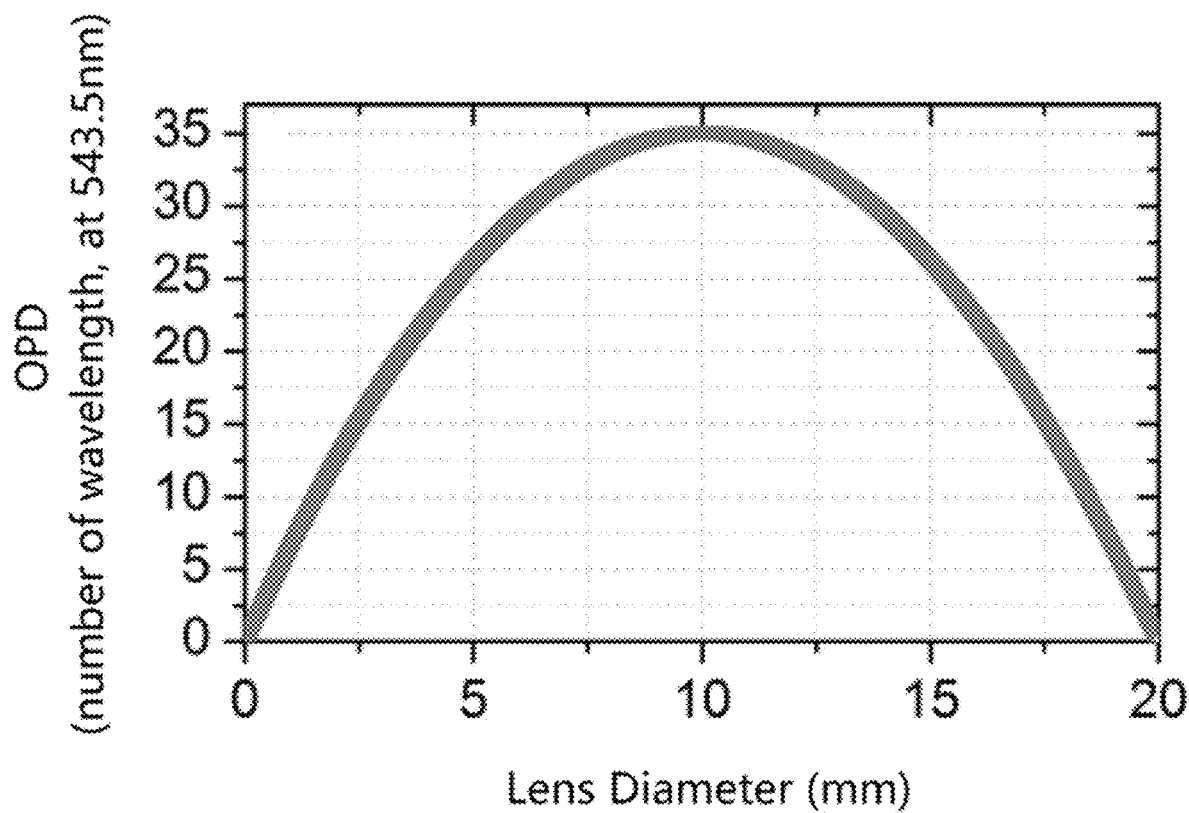
FIG. 6A illustrates a phase profile of an LC lens without phase resets.
Figure 6B:
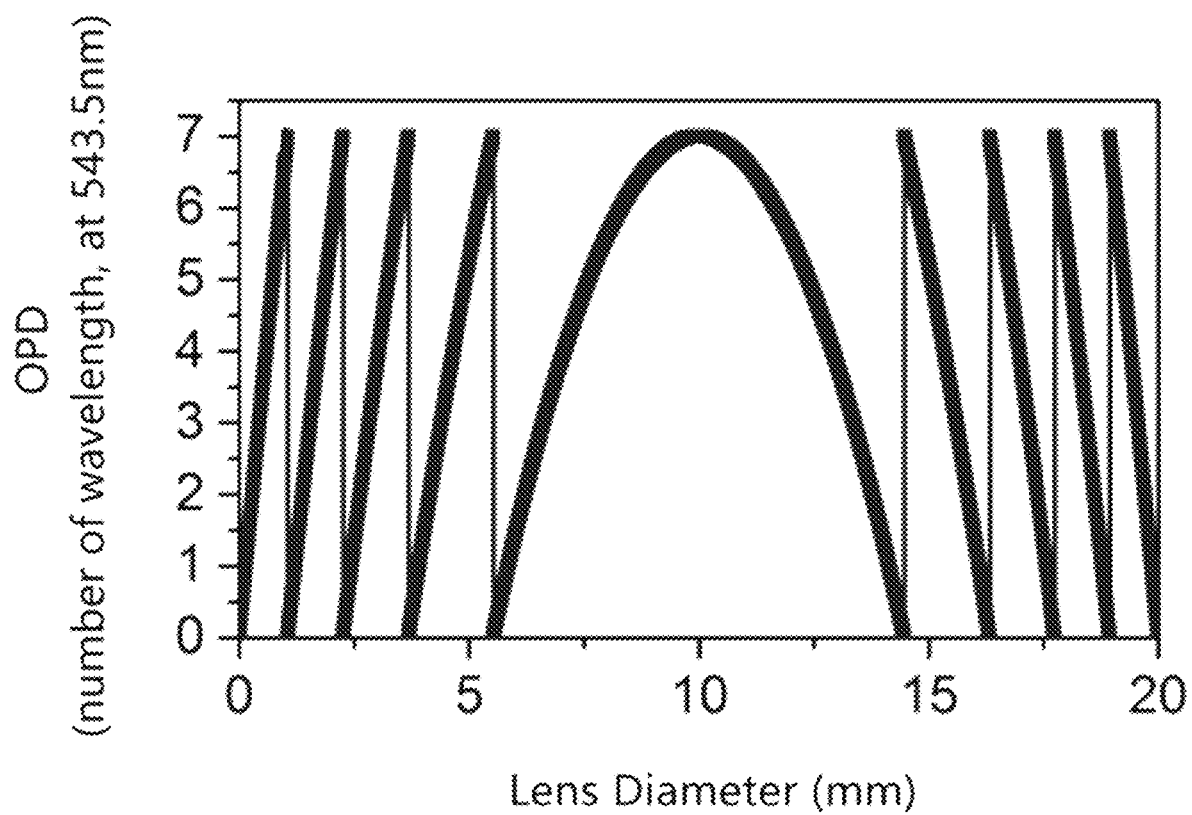
FIG. 6B illustrates a phase profile of an SPP LC lens, according to an embodiment of the disclosure.

FIG. 6A illustrates a phase profile for a ±0.375 Diopter (D) LC lens that does not include any phase resets, where the OPD equals to 35$\lambda$. The aperture of the LC lens is 20 mm, and the thickness of the LC cell is about 70 µm for LC materials with a birefringence $\Delta n$ of 0.27. To decrease the effective thickness of the LC cell, resets or segments may be introduced into the lens phase profile. FIG. 6B illustrates a 2D phase map of the SPP LC lens 500 shown in FIG. 5 when the SPP LC lens 500 includes 5 resets. The thickness of the LC cell is reduced by about 5 times and, accordingly, the response time is improved by a factor of 25. That is, through introducing the segments in the lens phase profile, the optical power of the SPP LC lens 500 may be adjusted sufficiently fast to keep pace with eye accommodation (e.g., accommodation occurs in around 300 ms), such that the vergence-accommodation conflict in the NEDs can be resolved.

Referring to FIG. 5 and FIG. 6B, the number of the resets may be determined based on specific configurations of the Fresnel structure and properties of the SPP LC lens 500 to be achieved, such as a predetermined optical power, a predetermined lens aperture, a predetermined switching time, and/or a predetermined image quality of the LC lens. A large number of phase steps within one wavelength of OPD (i.e., per wavelength) may be desirable for accurate representation of the phase profile. Meanwhile, to configure the SPP LC lens with a negligible diffraction angle for near eye applications, the minimum width of the Fresnel segments (i.e., the minimum Fresnel segment width) of the SPP LC lens 500 may be larger than about 1 mm for a green light having a wavelength of 543.5 nm.

Figure 7A:
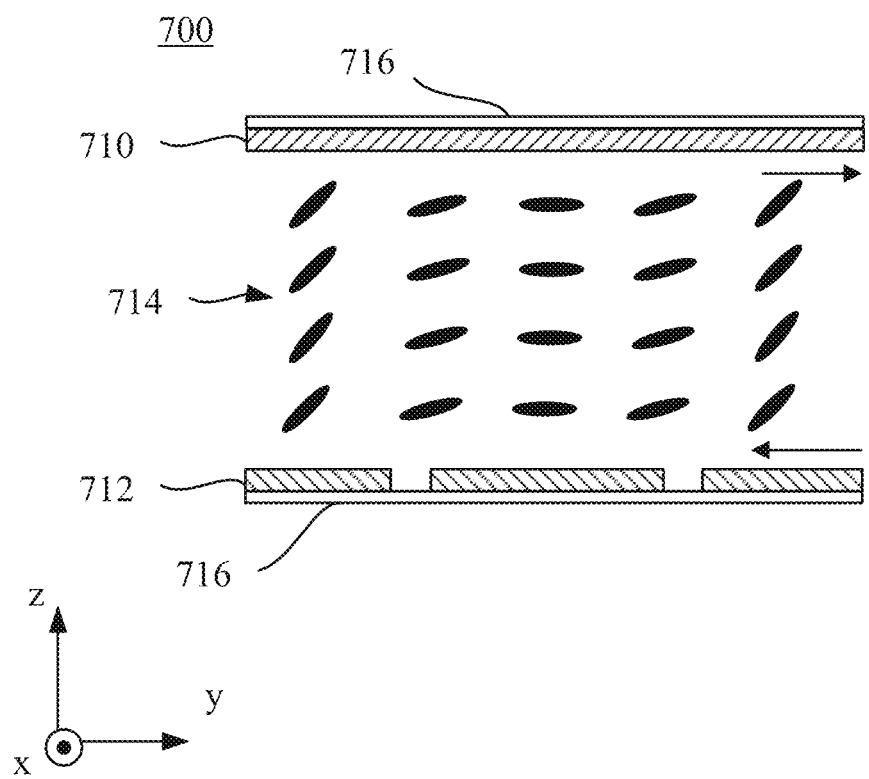
FIG. 7A illustrates a schematic diagram of an SPP LC lens, according to another embodiment of the disclosure.

FIG. 7A illustrates a schematic diagram of an SPP LC lens 700 according to an embodiment of the disclosure. The SPP LC lens 700 may be an embodiment of the SPP LC lens 500 shown in FIG. 5. As shown in FIG. 7A, the SPP LC lens 700 may include two substrates 716. One of the substrates 716 may be provided with a plurality of first electrodes 712, and the other of the substrates 716 may be provided with one or more second electrodes 710. A liquid crystal ("LC") layer 714 may be disposed between the two substrates 716. The substrates 716 may be substantially transparent in the visible band (about 380 nm to 750 nm). In some embodiments, the substrates 716 may be transparent in some or all of the infrared (IR) band (about 750 nm to 1 mm). The substrates 716 may include a transparent material, e.g., $SiO_2$, plastic, sapphire, etc. The first electrodes 712 and the second electrode 710 may be transparent electrodes (e.g., indium tin oxide electrodes). The electrodes may be electrically connected with a power source, which may provide a voltage to the electrodes to generate an electric field. The electric field may reorient the LC molecules in the LC layer 714 to form a lens having a predetermined phase profile. The SPP LC lens 700 may further include two alignment layers (not shown in FIG. 7A) provided at the first electrodes 712 and the second electrode 710, respectively. The alignment layers may provide an alignment (e.g., indicated by the arrows in FIG. 7A) to the LC molecules included in the LC layer 714.

In some embodiments, the SPP LC lens 700 may be polarization sensitive (or selective). That is, the SPP LC lens 700 may selectively focus or defocus a light of a predetermined polarization, and may not affect the optical power of a light of other polarizations. Referring to FIG. 3 and FIG. 7A, in some embodiments, the image light 350 output from the electronic display 310 may be a linearly polarized light. The SPP LC lens 700 (e.g., the alignment direction of the SPP LC lens) may be oriented relative to the polarization direction of the linearly polarized light 350 to provide an adjustable optical power, thereby realizing a varifocal bifocal optical element. In some embodiments, the image light 350 output from the electronic display 310 may be an unpolarized light. A linear polarizer may be disposed between the SPP LC lens 700 and the electronic display 310, and may convert the unpolarized light to a linearly polarized light, which may be incident onto the SPP LC lens 700. In some embodiments, the image light 350 output from the electronic display 310 may be a circularly polarized light. A quarter-wave plate ("QWP") may be disposed between the SPP LC lens 700 and the electronic display 310, and may be configured to convert the circularly polarized light to a linearly polarized light, which may be incident onto the SPP LC lens 700.

In some embodiments, the first electrodes 712 may include discrete ring-shaped electrodes corresponding to the Fresnel structures in the SPP LC lens 700. The ring-shaped electrodes may be concentric with identical area. That is, as the radii of the ring-shaped concentric electrodes increase, the width of the ring-shaped concentric electrodes decreases, thereby maintaining the identical area. With this electrode geometry, when the phase difference between adjacent first electrodes 712 may be the same. Accordingly, a parabolic phase profile may be obtained. Provided that the phase is proportional to the applied voltage, a linear change in the voltage across the first electrodes 712 (same difference in voltage between any two first electrodes 712) may yield a parabolic phase profile of the LC lens.

Figure 7B:
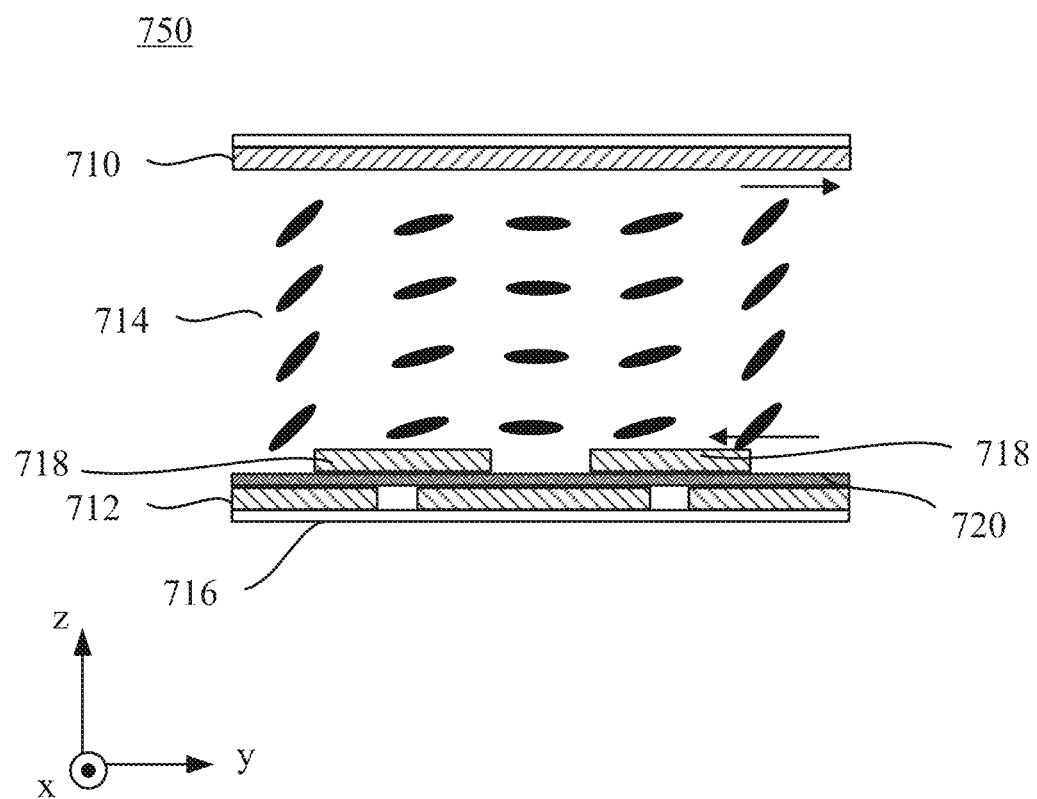
FIG. 7B illustrates a schematic diagram of an SPP LC lens having floating electrodes, according to an embodiment of the disclosure.

In some embodiments, the gaps between the first electrodes 712 may cause scattering of the image light, and hence, the image degradation. To address that image degradation, a plurality of floating electrodes may be introduced. FIG. 7B illustrates a schematic diagram of an SPP LC lens 750 having floating electrodes according to an embodiment of the disclosure. The SPP LC lens 750 shown in FIG. 7B may include elements and configurations that are similar to or the same as those included in the SPP LC lens 700 shown in FIG. 7A. Descriptions of the same or similar elements can refer to the above descriptions rendered in connection with FIG. 7A. As shown in FIG. 7B, a plurality of floating electrodes 718 may be disposed at the substrate 716 having the first electrodes 712. The floating electrodes 718 may include discrete and concentric ring electrodes which may not be driven by an ohmic connection but may be capacitively coupled to the first electrodes 712. The floating electrodes 718 may be configured to cover an area of each of neighboring first electrodes 712. An insulating layer 720 may be disposed between the floating electrodes 718 and the first electrodes 712. The insulating layer 720 may be configured to provide an electrical insulation to the first electrodes 712 and the floating electrodes 718.

Figure 8:
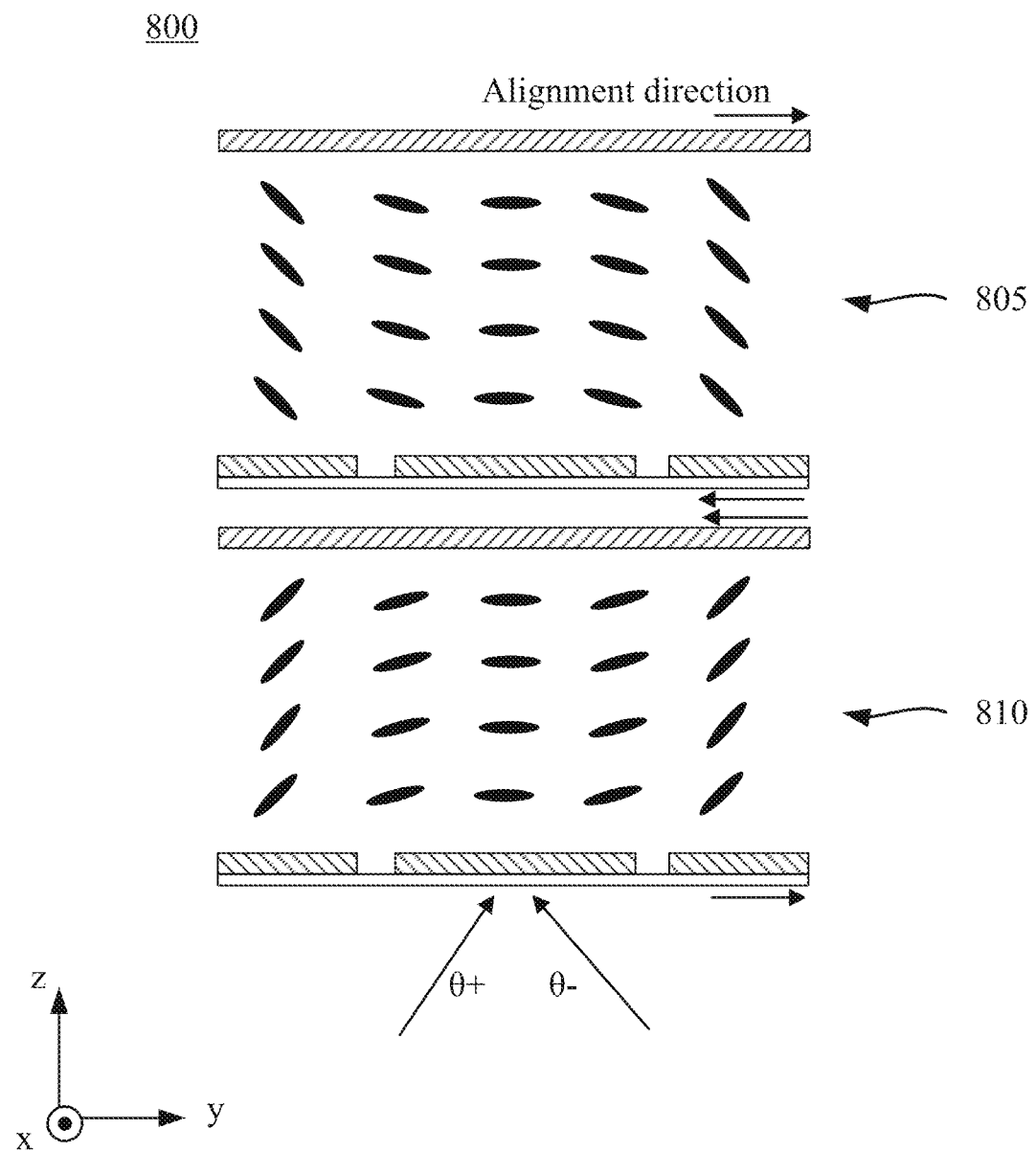
FIG. 8 illustrates a schematic diagram of an SPP LC lens stack, according to an embodiment of the disclosure.

To further improve the response time of the SPP LC lens, in some embodiments, multiple SPP LC lens (e.g., multiple lens layers) may be optically coupled to form a stack of SPP LC lens, i.e., an SPP LC lens stack, such that to achieve a same tunable optical power range, the thickness of each SPP LC lens may be reduced. Accordingly, the response of each SPP LC lens may be improved. FIG. 8 illustrates a schematic diagram of an SPP LC lens stack 800 according to an embodiment of the disclosure. For illustrative purposes, FIG. 8 shows that a pair of SPP LC lenses 805 and 810 may be optically coupled to form the SPP LC lens stack 800. Provided that each of SPP LC lenses 805 and 810 has 5 resets in the phase profile, considering the effect of the pair of lenses and the Fresnel resets, the thickness of the LC cell may be reduced by up to 10 times (5 resets×2). Therefore, the response speed may be improved by a factor of about 100. Moreover, the two SPP LC lenses 805 and 810 may have opposite alignment directions (e.g., rubbing directions) on the corresponding LC surfaces of the two SPP LC lenses 805 and 810, so as to improve the viewing angle. That is, for viewing angle improvement, two SPP LC lenses with the same configuration and opposite rubbing directions may be optically coupled.

In some embodiments, polarization insensitivity may be desirable for NEDs for some AR applications. Most LC materials are birefringent and, thus, are polarization sensitive. When the light propagating in a direction parallel to the LC director is incident onto the LC cell, the light experiences an ordinary refractive index no of the LC material for any polarization states. However, when the light propagating in a direction perpendicular to the LC director is incident onto the LC cell, the light experiences a refractive index between the ordinary refractive index no and an extraordinary refractive index ne of the LC material, depending on the polarization state of light. Cholesteric LC materials may be made polarization insensitive, as discussed by Clarke et al. in U.S. Pat. No. 7,728,949 B2, titled "Electro-active Lens." In the present disclosure, the pitch of cholesteric LCs can be made in the range of the wavelengths of incident lights. Therefore, when no voltage is applied to the LC cell, the light experiences an average refractive index $$\left(\frac{n_o + n_e}{2}\right)$$

independent of the polarization states of the light. For nematic LCs, the SPP LC lens or SPP LC lens stack may be configured to be polarization insensitive by optically coupling two LC cells configured for two orthogonal polarizations, in which one LC cell may focus a light having a first polarization and the other LC cell may focus a light having a second polarization that is orthogonal to the first polarization. For example, the SPP LC lens or SPP LC lens stack may include two optically coupled LC cells configured for orthogonal polarizations, where one cell may focus an s-polarized light and the other cell may focus a p-polarized light.

Figure 9A:
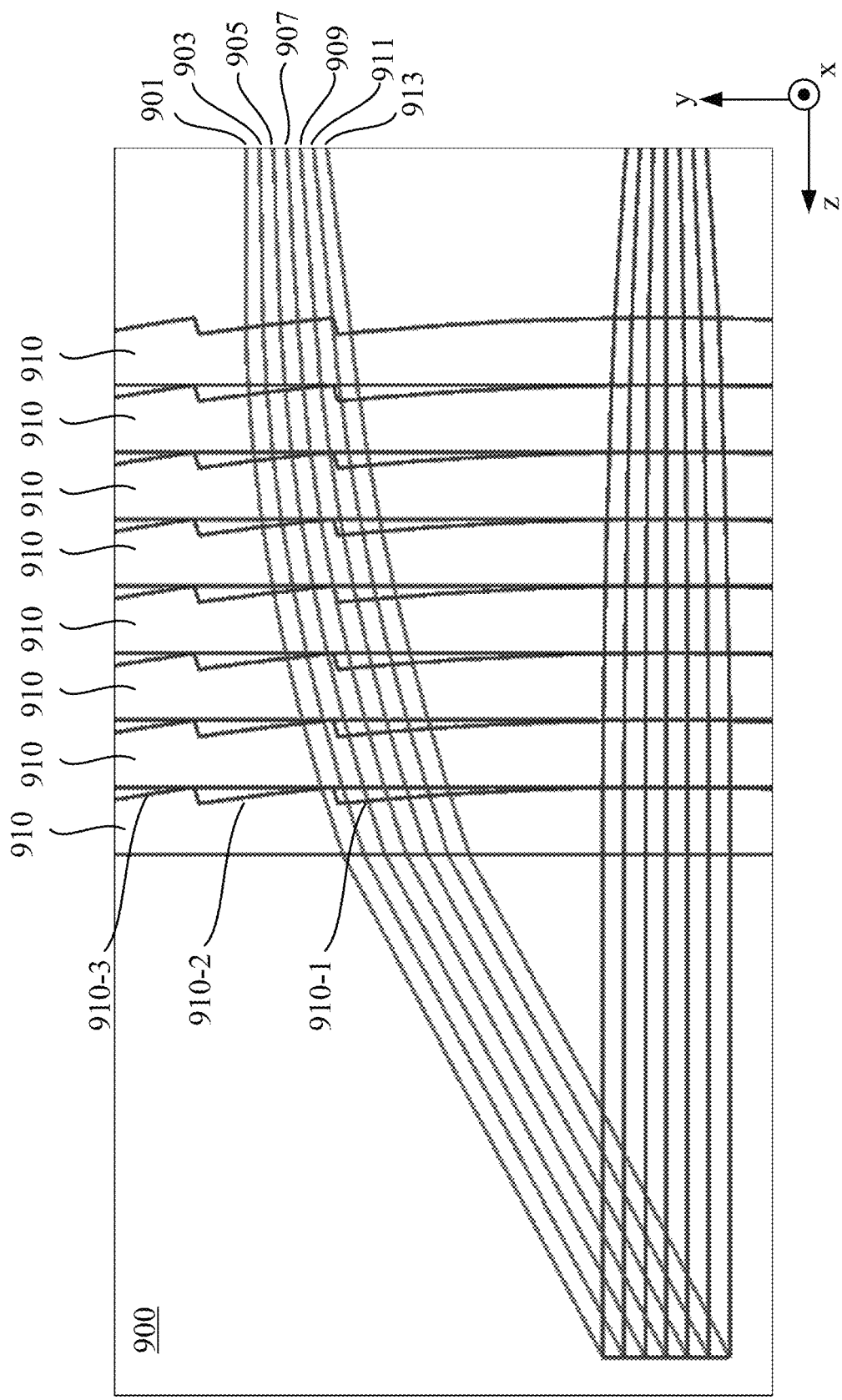
FIG. 9A illustrates a schematic diagram of an SPP LC lens stack without Fresnel resets offset, according to an embodiment of the disclosure.

FIG. 9A illustrates a schematic diagram of an SPP LC lens stack 900 where the SPP LC lenses are aligned with each other without Fresnel resets offset, according to an embodiment of the disclosure. As shown in FIG. 9A, the SPP LC lens stack 900 may include a plurality of SPP LC lenses or SPP LC lens layers 910 stacked in a z-direction. Each SPP LC lens 910 may have a Fresnel structure including a plurality of concentric ring-shaped zones (similar to 505a, 505b, 505c, and 505d shown in FIG. 5) of increasing radii. Each SPP LC lens 910 may have a same configuration of the concentric ring-shaped zones or Fresnel resets, for example, the radius of the corresponding ring-shaped zones in different SPP LC lenses 910 may be the same. For illustrative purposes, FIG. 9A shows the SPP LC lens stack 900 may include eight SPP LC lenses 910, and each SPP LC lens 910 may include three concentric ring-shaped zones of increasing radii: a first zone 910-1, a second zone 910-2, and a third zone 910-3. The first zones 910-1 of the eight SPP LC lenses 910 may have the same radius, the second zones 910-2 of the eight SPP LC lenses 910 may have the same radius, and the third zones 910-3 of the eight SPP LC lenses 910 may have the same radius.

Figure 9B:
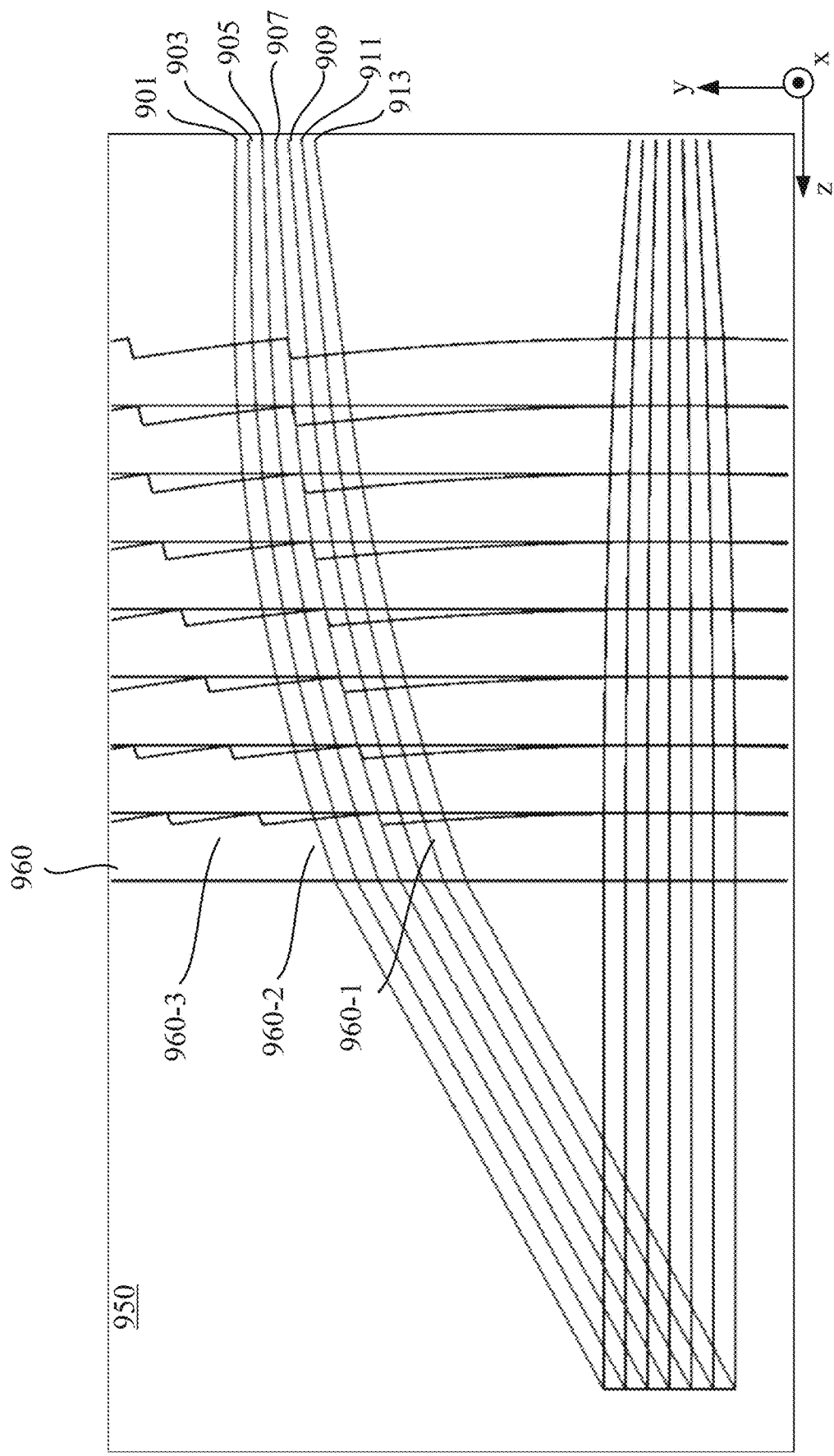
FIG. 9B illustrates a schematic diagram of an SPP LC lens stack with Fresnel resets offset, according to an embodiment of the disclosure.

Chief rays (a chief ray is a ray from an off-axis point in an object passing through the center of an aperture stop) from different off-axis points in the object may experience different phases after being transmitted through the SPP LC lens stack 900 due to the unmatched Fresnel resets. For example, shown in FIG. 9A, a chief ray 901 may propagate through eight second zones 910-2, a chief ray 903 may propagate through seven second zones 910-2 and one first zone 910-1, a chief ray 905 may propagate through six second zones 910-2 and two first zone 910-1, and so on. A chief ray 913 may propagate through eight first zones 910-1. That is, chief rays 901, 903, 905, 907, 909, 911, and 913 may each experience a different phase after transmitted through the SPP LC lens stack 900 due to the unmatched Fresnel resets. As a result, when cutting up the pupil with unmatched Fresnel resets the chief rays 901, 903, 905, 907, 909, 911, and 913, each slide may provide a different phase. For example, a slide of the SPP LC lens stack 900 between the cutting lines the chief rays 901 and 903, a slide of the SPP LC lens stack 900 between the cutting lines the chief rays 903 and 905, a slide of the SPP LC lens stack 900 between the cutting lines the chief rays 905 and 907, a slide of the SPP LC lens stack 900 between the cutting lines the chief rays 907 and 909, a slide of the SPP LC lens stack 900 between the cutting lines the chief rays 909 and 911, and a slide of the SPP LC lens stack 900 between the cutting lines the chief rays 911 and 913 may provide a different phase. In view of this, in the disclosed embodiments, a Fresnel resets offset may be introduced to the SPP LC lens stack to address the concern of the unmatched Fresnel resets in different slides when cutting up the pupil. FIG. 9B illustrates a schematic diagram of an SPP LC lens stack 950 having a Fresnel resets offset, according to an embodiment of the disclosure. For illustrative purposes, FIG. 9B shows that the SPP LC lens stack 950 may include eight SPP LC lenses 960, and each SPP LC lens 960 may include three concentric ring-shaped zones or Fresnel resets of increasing radii: a first zone 960-1, a second zone 960-2, and a third zone 960-3. The Fresnel resets may be offset by following a chief ray from nominal eye relief, such that the number of cuts may be reduced. For example, as shown in FIG. 9B, the first zones 960-1 of the eight SPP LC lenses 960 may be offset by following the chief ray 907 from nominal eye relief, the second zones 960-2 of the eight SPP LC lenses 960 may be offset by following the chief ray 901 from nominal eye relief. Thus, the chief rays 901, 903, and 905 may experience the same phase, and the chief rays 907, 909, 911, and 913 may experience the same phase. Thus, the number of cuts in the pupil may be reduced. For example, the pupil could still be cut up by 1 mm slices at edge of field.

Figure 10:
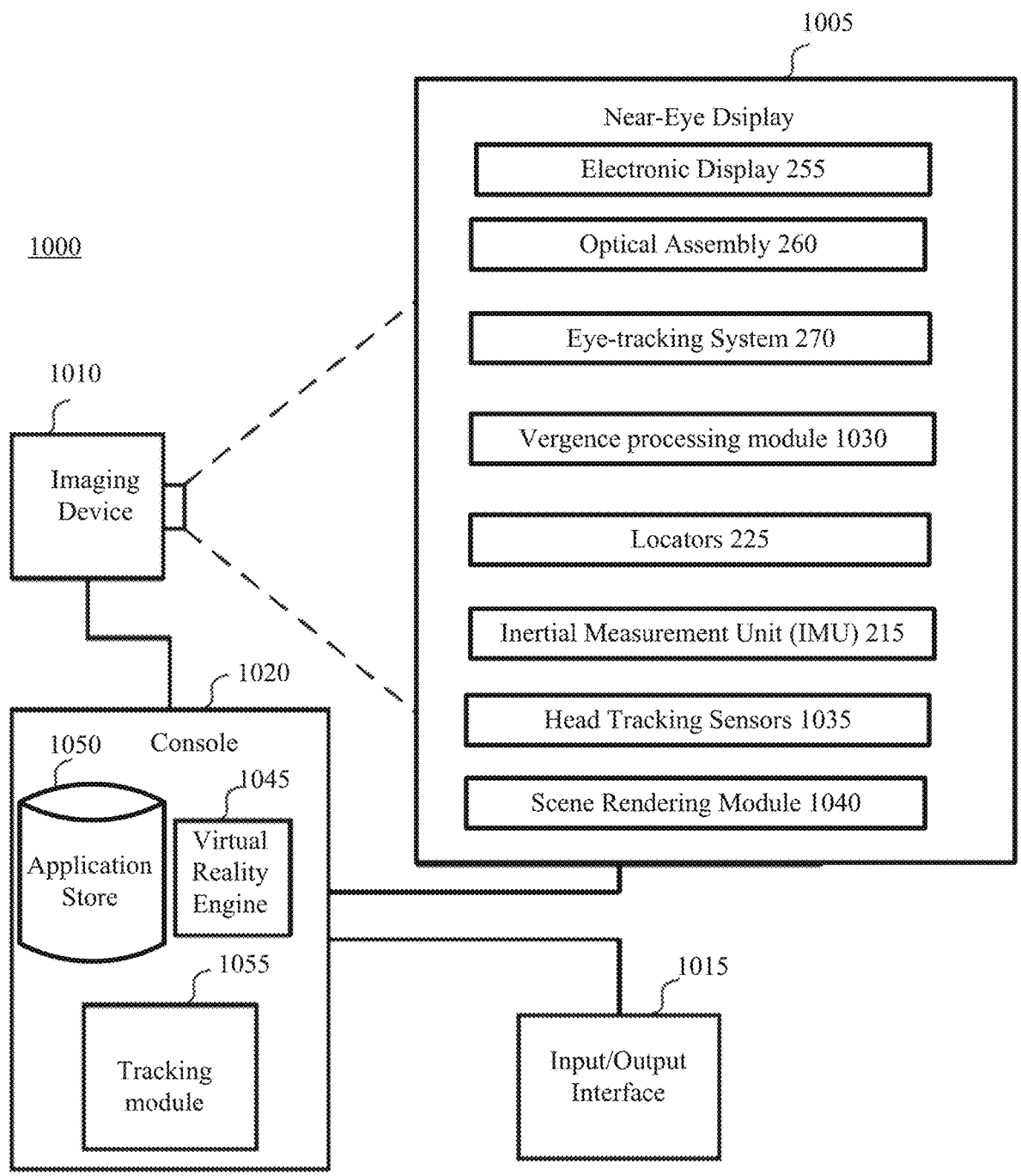
FIG. 10 illustrates a block diagram of a system, according to an embodiment of the disclosure.

FIG. 10 illustrates a block diagram of a system 1000 according to an embodiment of the disclosure. The system 1000 may be included in a VR system, an AR system, an MR system, or a combination thereof. As shown in FIG. 10, the system 1000 may include an imaging device 1010, a console 1020, an input/output interface 1015, and an NED 1005. In some embodiments, one or more devices or components shown in FIG. 10 may be omitted, and in other embodiments, one or more devices or components not shown in FIG. 10 may also be included. Although FIG. 10 shows a single NED 1005, a single imaging device 1010, and a single input/output interface 1015, any number of these components may be included in the system 1000. The NED 1005 may function as a VR, an AR, and/or an MR NED, or a combination thereof.

The NED 1005 may be configured to present content (e.g., media content) to a user. In some embodiments, the NED 1005 may be an embodiment of the NED 200 described above with reference to FIGS. 2A and 2B. Example content may include images, videos, audios, or a combination thereof. Audio content may be presented via a separate device (e.g., speakers and/or headphones) external to the NED 1005, the console 1020, or both. The NED 1005 may include the one or more locators 225, the internal measurement unit (IMU) 215, the electronic display 255, the optical assembly 260, the eye-tracking system 270, which are described above with reference to FIG. 2A and FIG. 2B, a vergence processing module 1030, head tracking sensors 1035, and a scene rendering module 1040. The vergence processing module 1030 and the scene rendering module 1040 may be parts of a processor, and may each be implemented as hardware components, software components, or both.

The eye-tracking system 270 may track an eye position and/or an eye movement of a user of the NED 1005. A camera or other optical sensor (that may be a part of the eye-tracking system 270) inside the NED 1005 may capture images of the eyes, and the eye-tracking system 270 may use determine, based on the images and/or other sensor data, eye-tracking information, such as an interpupillary distance, an interocular distance, a three-dimensional ("3D") position of each eye relative to the NED 1005 (e.g., for distortion adjustment purposes), including a magnitude of torsion and rotation (i.e., roll, pitch, and yaw) and gaze directions for each eye. In some embodiments, an infrared light may be emitted within the NED 1005, e.g., by a light source included therein. The infrared light may illuminate each eye and may be reflected by each eye and/or skins around the eye. The reflected light may be received or detected by the camera. The camera may generate images of the eyes based on the received reflected light. A processor included in the eye-tracking system 270 may analyze the images to extract eye-tracking information, such as an eye rotation based on changes in the infrared light reflected by each eye. Any suitable methods for tracking the eyes of a user may be implemented in the eye-tracking system 270. Accordingly, the eye-tracking system 270 may track up to six degrees of freedom of each eye (i.e., 3D positions, roll, pitch, and yaw). At least a subset of the tracked quantities relating to both eyes may be combined to estimate a gaze point (i.e., a 3D location or position in the virtual scene where the user is looking at). For example, the eye-tracking system 270 may integrate information from past measurements, measurements identifying a position of a user's head, and 3D information describing a scene presented by the electronic display 255. Thus, eye-tracking information for the position and orientation of the user's eyes is used to determine the gaze point in a virtual scene presented by the NED 1005 where the user is currently looking.

The optical assembly 260 may include a multifocal optical element, which may be any one of the disclosed multifocal optical elements. The multifocal optical element may provide optical corrections or adjustments to an image light emitted from different portions of the electronic display 255, and direct the optically corrected image light to an eye-box of the NED 1005. The multifocal optical element may also mitigate vergence-accommodation conflict for a variety of users, such as users having different accommodative ranges. As noted above with reference to FIGS. 3-9A, based on the eye-tracking information, the optical assembly 260 may activate one or more LC lenses corresponding to the eye position for each eye of the user, and adjust the focal length of the optical assembly 260 by adjusting the voltages supplied to the electrodes of the one or more activated LC lenses. The optical assembly 260 may adjust the focal length responsive to instructions from the console 1020, which may include a processor or controller configured to control the voltages supplied to the electrodes, or a separate controller or processor included in the system 1000. Note that a varifocal tuning speed of a varifocal structure is typically limited by a tuning speed of the LC lenses. The optical assembly 260 may selectively deactivate one or more other LC lenses that are not corresponding to the eye position for each eye of the user, thereby reducing the power consumption of the optical assembly 260.

The vergence processing module 1030 may be implemented as a hardware component (e.g., may include circuits, gates, switches), a software component (e.g., may include computer-executable instructions encoded in a non-transitory computer-readable medium), or both. In some embodiments, the vergence processing module 1030 may be a part of a controller or a processor included in the NED 1005, for example, a processor included in the eye-tracking system 270, although for illustrative purposes they are shown separately. In some embodiments, the vergence processing module 1030 may include, or may be included in, a hardware central processing unit ("CPU"), graphic processing unit ("GPU"), and/or a microcontroller. The vergence processing module 1030 may be configured to determine a vergence distance of a user's gaze based on the gaze point or an estimated intersection of the gaze lines determined by the eye-tracking system 270. Vergence is the simultaneous movement or rotation of both eyes in opposite directions to maintain a single binocular vision, which is naturally and automatically performed by the human eyes. Thus, a location where eyes are verged is where the eyes of user are currently looking at, and is also typically the location where the user's eyes are currently focused. For example, the vergence processing module 1030 may triangulate the gaze lines to estimate a distance or depth from the user associated with intersection of the gaze lines. Then the depth associated with intersection of the gaze lines may be used as an approximation for the accommodation distance, which identifies a distance from the user where the user's eyes are directed. Thus, the vergence distance may allow the determination of a location where the user's eyes should be focused.

The locators 225 may be objects located at specific locations on the NED 1005 relative to one another and relative to a specific reference point or location on the NED 1005. In some embodiments, a locator 225 may be a light emitting diode ("LED"), a corner cube reflector, a reflective marker, a type of light source that contrasts with an environment in which the NED 1005 operates, or a combination thereof.

The IMU 215 may be an electronic device configured to generate fast calibration data based on measurement signals received from one or more of the head tracking sensors 1035. The head tracking sensors 1035 may be configured to generate one or more measurement signals in response to motions of NED 1005. Examples of the head tracking sensors 1035 may include accelerometers, gyroscopes, magnetometers, other sensors suitable for detecting motions, correcting errors associated with the IMU 215, or a combination thereof. Based on the measurement signals from the head tracking sensors 1035, the IMU 215 may generate fast calibration data indicating an estimated position of the NED 1005 relative to an initial position of the NED 1005. For example, the head tracking sensors 1035 may include multiple accelerometers configured to measure translational motions (forward/back, up/down, left/right) and multiple gyroscopes configured to measure rotational motions (e.g., pitch, yaw, and roll). The IMU 215 may, for example, rapidly sample the measurement signals at a predetermined sampling rate, and calculate the estimated position of the NED 1005 from the sampled data. In some embodiments, the IMU 215 may provide the sampled measurement signals to the console 1020 (which may include a controller or processor), which may determine the fast calibration data.

The IMU 215 may receive one or more calibration parameters from the console 1020. The calibration parameters may be determined by the console 1020 based on the fast calibration data. As further discussed below, the one or more calibration parameters may be used to maintain the tracking of the NED 1005. Based on a received calibration parameter, the IMU 215 may adjust one or more of the IMU parameters (e.g., the sampling rate). In some embodiments, one or more calibration parameters may be configured to instruct the IMU 215 to update an initial position of the reference point to correspond to a next calibrated position of the reference point. Updating the initial position of the reference point as the next calibrated position of the reference point may help reduce an accumulated error associated with the determination of the estimated position. The accumulated error, also referred to as a drift error, may cause the estimated position of the reference point to drift away from the actual position of the reference point over time.

The scene rendering module 1040 be implemented as a hardware component (e.g., may include circuits, gates, switches), a software component (e.g., may include computer-executable instructions encoded in a non-transitory computer-readable medium), or both. In some embodiments, the scene rendering module 1040 may be a part of a controller or a processor included in the NED 1005, for example, a processor included in the eye-tracking system 270, although for illustrative purposes they are shown separately. The scene rendering module 1040 may receive contents for the virtual scene from a VR engine 1045, and provide display content for display on the electronic display 255. In some embodiments, the scene rendering module 1040 may include, or may be included in, a hardware central processing unit ("CPU"), graphic processing unit ("GPU"), and/or a microcontroller. In some embodiments, the scene rendering module 1040 may adjust the content based on eye-tracking information from the eye-tracking system 270, data from the vergence processing module 1030, motion data from the IMU 215, and/or head tracking data from the head tracking sensors 1035. The scene rendering module 1040 may determine a portion of the content to be displayed on the electronic display 255, based on data received from one or more of the eye-tracking system 270, a tracking module 1055, the head tracking sensors 1035, or the IMU 215. For example, the scene rendering module 1040 may determine a virtual scene to be displayed to the viewer's eyes, or any part of the virtual scene. The scene rendering module 1040 may also dynamically adjust the displayed content based on the real-time configuration of the optical assembly 260. In addition, based on the information of the determined lens center shift provided by the optical assembly 260, the scene rendering module 1040 may determine an image shift of the virtual scene displayed on the electronic display 255. In some embodiments, the image shift of the virtual scene (or virtual image) may be on the electronic display 255.

The imaging device 1010 may provide a monitoring function for the NED 1005 and may generate slow calibration data in accordance with calibration parameters received from the console 1020. Slow calibration data may include one or more images showing observed positions of the locators 225 that are detectable by imaging device 1010. The imaging device 1010 may include one or more cameras, and/or other devices configured to capture images of one or more locators 225, or a combination thereof. Slow calibration data may be communicated from the imaging device 1010 to the console 1020, and the imaging device 1010 may receive one or more calibration parameters from the console 1020 to adjust one or more imaging parameters (e.g., a focal length, a focus, a frame rate, an ISO, a sensor temperature, a shutter speed, an aperture, etc.).

The input/output interface 1015 may be a device that allows a user to send action requests to the console 1020. An action request may be a request to perform a predetermined action. For example, an action request may be a quest to start or end an application or to perform a predetermined action within the application. The input/output interface 1015 may include one or more input devices such as a keyboard, a mouse, a game controller, or any other suitable device. An action request received by the input/output interface 1015 may be communicated to the console 1020, which performs an action corresponding to the action request. In some embodiments, the input/output interface 1015 may provide haptic feedback to the user in accordance with instructions received from the console 1020. For example, the haptic feedback may be provided by the input/output interface 1015 when an action request is received, or the console 1020 may communicate instructions to the input/output interface 1015 causing the input/output interface 1015 to generate the haptic feedback when the console 1020 performs an action.

The console 1020 may provide content to the NED 1005 for presentation to the user in accordance with information received from the imaging device 1010, the NED 1005, and/or the input/output interface 1015. In one embodiment, as shown in FIG. 10, the console 1020 may include an application store 1050, a tracking module 1055, and the VR engine 1045, etc. The application store 1050 may store one or more applications for execution by the console 1020. An application may be a group of computer-executable instructions that, when executed by a processor, generate content for presentation to the user. Content may be generated by an application in response to inputs received from the user via movement of the NED 1005 and/or the input/output interface 1015. Examples of applications include gaming applications, conferencing applications, video playback application, or other suitable applications.

The tracking module 1055 may calibrate the system 1000 based on one or more calibration parameters and may adjust one or more calibration parameters to reduce errors (or improve accuracy) in determining positions of the NED 1005. For example, the tracking module 1055 may adjust the focus of the imaging device 1010 to obtain a more accurate position for observed locators 225 on the NED 1005. Moreover, calibration performed by the tracking module 1055 may also account for information received from the IMU 215. In some embodiments, when tracking of the NED 1005 is lost (e.g., imaging device 1010 loses line of sight of at least a threshold number of locators 225), the tracking module 1055 may re-calibrate some or all of the system environment 1000 components.

In some embodiments, the tracking module 1055 may track the movement of the NED 1005 based on slow calibration information received from the imaging device 1010, and determine positions of a reference point on the NED 1005 based on observed locators from the slow calibration information and a model of the NED 1005. The tracking module 1055 may also determine positions of the reference point on the NED 1005 based on position information from the fast calibration information from the IMU 215. In some embodiments, the tracking module 1055 may use portions of the fast calibration information, the slow calibration information, or a combination thereof, to predict a future location of the NED 1005, which may be provided to the VR engine 1045.

The VR engine 1045 may execute applications (or computer-executable instructions) within the system 1000 and receive position information, acceleration information, velocity information, predicted future positions, or a combination thereof for the NED 1005 from the tracking module 1055. Based on the received information, the VR engine 1045 may determine content to provide to the NED 1005 for presentation to the user, such as a virtual scene, one or more virtual objects to overlay onto a real-world scene, etc. In some embodiments, the VR engine 845 may maintain focal capability information of the optical assembly 260. Focal capability information may include information that describes what focal distances are available to the optical assembly 260. Focal capability information may include, e.g., a range of focus that the optical assembly 260 is configured to accommodate (e.g., 0 to 4 diopters), combinations of settings for each activated LC lens that map to predetermined focal planes, or a combination thereof.

The VR engine 1045 may provide information to the optical assembly 260, such as the accommodation and/or convergence parameters including what focal distances are available to the optical assembly 260. The VR engine 1045 may generate instructions for the optical assembly 260. The instructions may be configured to cause or instruct the optical assembly 260 to adjust its focal distance to a predetermined location. The VR engine 1045 may generate the instructions based on focal capability information and information from at least one of the vergence processing module 1030, the IMU 215, or the head tracking sensors 1035. The VR engine 1045 may provide the instructions to the optical assembly 260 to configure and/or adjust the adaptive assembly 260. The VR engine 1045 may use the information from the vergence processing module 1030, the IMU 215, and the head tracking sensors 1035, or a combination thereof, to select a focal plane to present content to the user. In some embodiments, the VR engine 1045 may perform an action within an application executed by the console 1020 in response to an action request received from the input/output interface 1015. The VR engine 1045 may provide a feedback to the user relating to the performance of the action. The provided feedback may be visual or audible feedback presented to the user via the NED 1005 or haptic feedback presented to the user via the input/output interface 1015.

The foregoing description of the embodiments of the disclosure have been presented for the purpose of illustration. It is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A device, comprising:
an electronic display configured to emit a first image light and a second image light; and
an optical assembly configured to direct the first image light and the second image light to an eye-box of the device, the optical assembly comprising:
a first optical element portion configured to focus the first image light propagating through the first optical element portion to a first image plane; and
a second optical element portion configured to focus the second image light propagating through the second optical element portion to a second image plane different from the first image plane, the second optical element portion including a liquid crystal ("LC") lens configured to provide an adjustable optical power,
wherein the second optical element portion is surrounded by and encapsulated in the first optical element portion, and
wherein a first focal length of the first optical element portion is greater than a second focal length of the second optical element portion.

2. The device of claim 1, wherein the LC lens includes a segmented phase profile ("SPP") LC lens.

3. The device of claim 2, wherein the SPP LC lens has a Fresnel structure including a plurality of Fresnel resets that are concentric ring-shaped zones of increasing radii.

4. The device of claim 3, wherein:
the SPP LC lens includes a plurality of ring electrodes corresponding to the plurality of Fresnel resets, the ring electrodes being concentric and having an identical area, and
a phase difference between adjacent Fresnel resets is substantially the same.

5. The device of claim 4, wherein:
the ring electrodes are driving electrodes,
the SPP LC lens further includes a plurality of floating electrodes that are discrete and concentric ring electrodes, and are capacitively coupled to the driving electrodes through an insulating layer, and
each floating electrode covers an overlapping area between neighboring driving electrodes.

6. The device of claim 1, wherein the LC lens includes a plurality of SPP LC lenses stacked together.

7. The device of claim 6, wherein each SPP LC lens has a Fresnel structure including a plurality of Fresnel resets that are concentric ring-shaped zones of increasing radii.

8. The device of claim 7, wherein the corresponding Fresnel resets of the plurality of SPP LC lenses are offset by a predetermined distance in a lens plane.

9. The device of claim 6, wherein the plurality of SPP LC lenses include two stacked SPP LC lenses, with a same configuration and opposite alignment directions.

10. The device of claim 1, further comprising a controller configured to:
determine a vergence distance of a virtual object represented by the second image light and viewed through the second optical element portion.

11. The device of claim 10, wherein the controller is further configured to:
determine, based on the determined vergence distance, the optical power of the LC lens; and
control the LC lens to provide the determined optical power to adjust an image distance of the second image plane at which the second image light propagating through the second optical element portion is focused to correspond to the vergence distance.

12. The device of claim 10, further comprising an eye-tracking device configured to obtain eye-tracking information and to provide the eye-tracking information to the controller.

13. A system, comprising:
an eye-tracking device configured to obtain eye-tracking information; and
an optical assembly comprising:
a first optical element portion configured to focus a first image light propagating through the first optical element portion to a first image plane; and
a second optical element portion configured to focus a second image light propagating through the second optical element portion to a second image plane, the second optical element portion including a liquid crystal ("LC") lens configured to provide an adjustable optical power adjustable based on the eye-tracking information,
wherein the second optical element portion is surrounded by and encapsulated in the first optical element portion, and
wherein a first focal length of the first optical element portion is greater than a second focal length of the second optical element portion.

14. The system of claim 13, wherein the LC lens includes a plurality of segmented phase profile ("SPP") LC lenses stacked together.

15. The system of claim 14, wherein at least one of the plurality of SPP LC lenses has a Fresnel structure including a plurality of Fresnel resets that are concentric ring-shaped zones of increasing radii.

16. The system of claim 15, wherein the corresponding Fresnel resets of the plurality of SPP LC lenses are offset by a predetermined distance in a lens plane.

17. The system of claim 15, wherein:
at least one of the plurality of SPP LC lenses includes a plurality of ring electrodes corresponding to the plurality of Fresnel resets, the ring electrodes being concentric and having an identical area, and
a phase difference between adjacent Fresnel resets is substantially the same.

18. The system of claim 17, wherein:
the ring electrodes are driving electrodes,
at least one of the plurality of SPP LC lenses further includes a plurality of floating electrodes that are discrete and concentric ring electrodes, and are capacitively coupled to the driving electrodes through an insulating layer, and
at least one of the plurality of floating electrodes covers an overlapping area between neighboring driving electrodes.

19. The device of claim 1, wherein:
the first image light represents a far virtual object displayed by a first portion of the electronic display, and
the second image light represents a near virtual object displayed by a second portion of the electronic display.

* * * * *